United States Patent [19]

Stein et al.

[11] Patent Number: 5,497,463

[45] Date of Patent: Mar. 5, 1996

[54] ALLY MECHANISM FOR INTERCONNECTING NON-DISTRIBUTED COMPUTING ENVIRONMENT (DCE) AND DCE SYSTEMS TO OPERATE IN A NETWORK SYSTEM

[75] Inventors: Scott A. Stein; Bruce M. Carlson, both of Phoenix, Ariz.; Chung S. Yen, Bedford, Mass.; Kevin M. Farrington, Williamsville, N.Y.

[73] Assignee: Bull HN Information Systems Inc., Billerica, Mass.

[21] Appl. No.: 951,069

[22] Filed: Sep. 25, 1992

[51] Int. Cl.$^6$ .......................... G06F 13/00; G06F 13/20; G06F 15/16

[52] U.S. Cl. .................... 395/200.03; 395/500; 395/600; 395/650; 364/280; 364/280.6; 364/283.1; 364/284.2

[58] Field of Search ...................................... 395/500, 200, 395/650, 600

[56] References Cited

U.S. PATENT DOCUMENTS

| | | | |
|---|---|---|---|
| 3,614,745 | 10/1971 | Podvin | 340/172.5 |
| 4,466,063 | 8/1984 | Segarra et al. | 364/200 |
| 4,768,150 | 8/1988 | Chang et al. | 364/300 |
| 4,972,368 | 11/1990 | O'Brien et al. | 364/900 |
| 5,027,271 | 6/1991 | Curley et al. | 364/200 |
| 5,228,137 | 7/1993 | Kleinerman et al. | 395/500 |
| 5,280,610 | 1/1994 | Travis, Jr. et al. | 395/600 |
| 5,327,532 | 7/1994 | Ainsworth et al. | 395/200 |

OTHER PUBLICATIONS

Vaeca, "Modest Progress", Jul. 1992, p. 77 (5), Lan Magazine.

Rymer, "Needed: A Comprehensive Approach to Development", Jan. 27, 1992, P. 37(1), Network World.

Dineen, "The Network Computing Architecture and System", 1988, pp. 296–299, IEEE.

Kaashoek, "Group Communication in the AMOEBA Distributed Operating System", 1991, pp. 222–230, IEEE.

IBM Technical Disclosure Bulletin, vol. 35, No. 4A, Sep. 1992, New York, US. pp. 117–118 XP314703 'DCEmail: A Distributed E-mail System Design' See p. 2.

Primary Examiner—Thomas C. Lee
Assistant Examiner—Rehana P. Krick
Attorney, Agent, or Firm—Faith F. Driscoll; John S. Solakian

[57] ABSTRACT

A distributed system includes a non-distributed computing environment (DCE) computer system and at least one DCE computer system which are loosely coupled together through a communications network operating with a standard communications protocol. The non-DCE and DCE computer systems operate under the control of proprietary and UNIX based operating systems respectively. The non-DCE computer system further includes application client software for providing access to distributed DCE service components via a remote procedure call (RPC) mechanism obtained through application server software included on the DCE computer system. A minimum number of software components modules which comprise client RPC runtime component and an import API component included in the non-DCE computer system and an Ally component on the DCE computer systems to operate in conjunction with the client and server software to provide access to DCE services by non-DCE user applications through the RPC mechanisms of both systems eliminating the need to port the DCE software service components onto the non-DCE computer system.

14 Claims, 7 Drawing Sheets

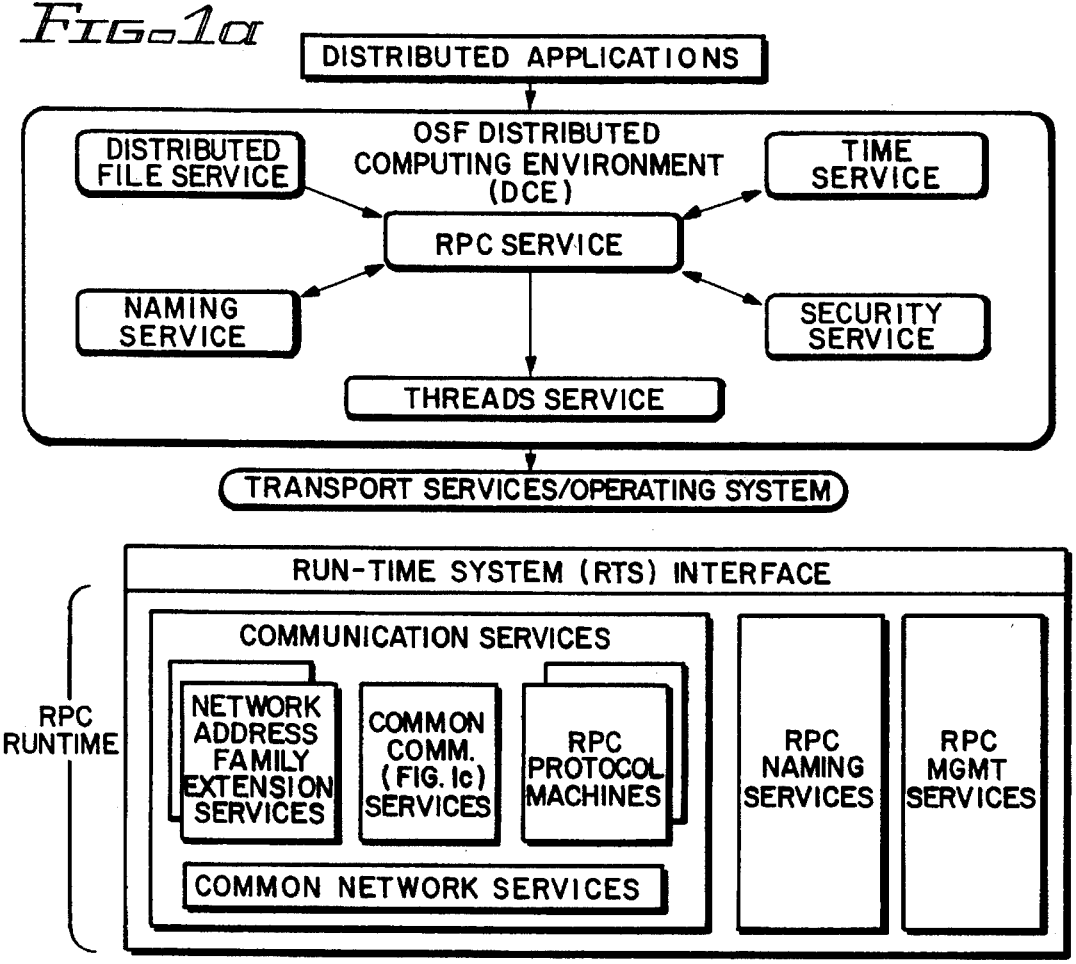
FIG. 1a
FIG. 1b
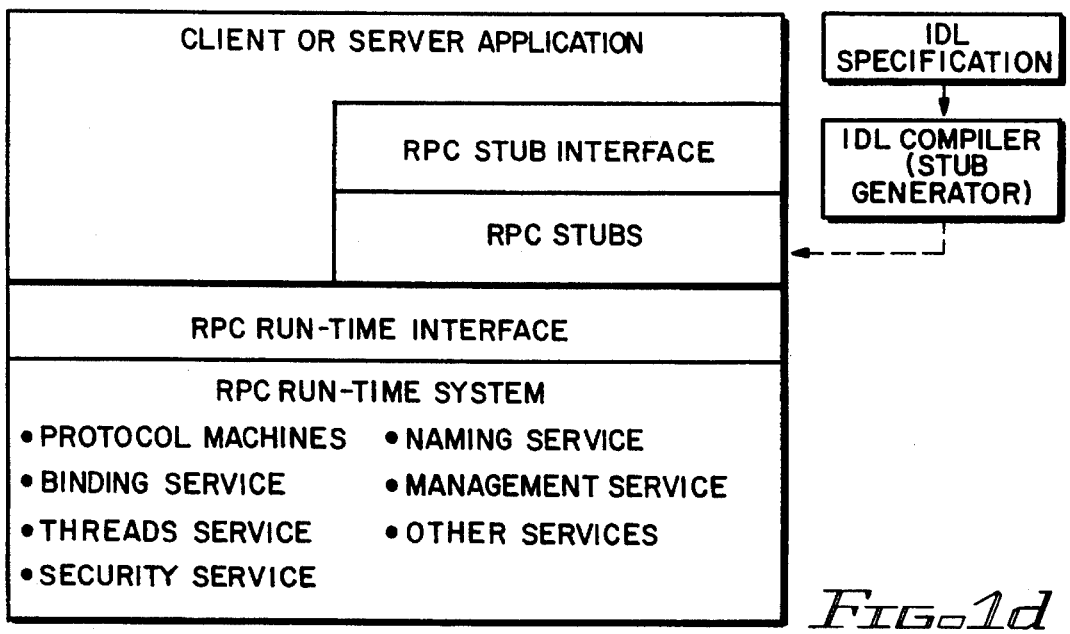
FIG. 1d

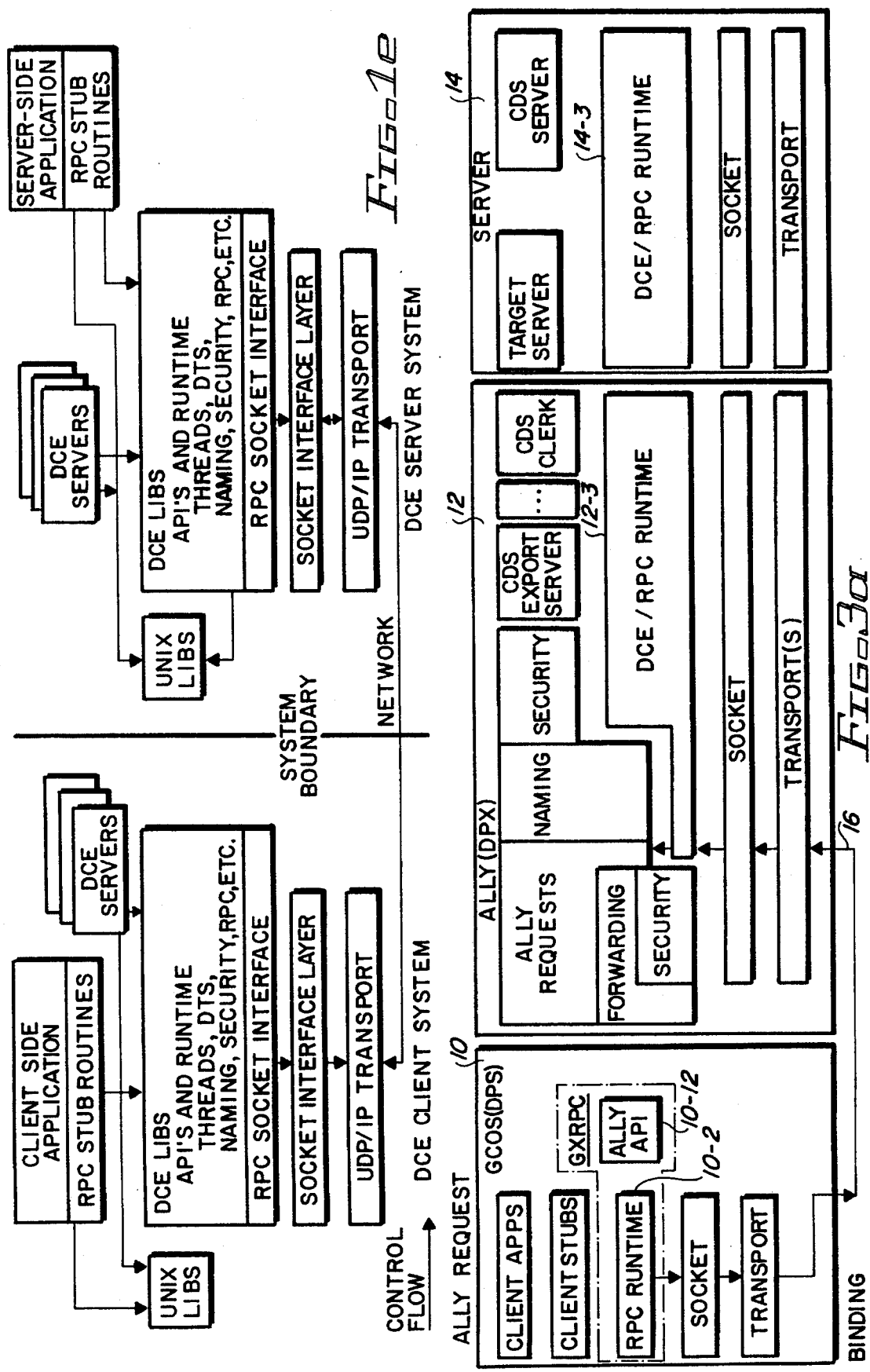

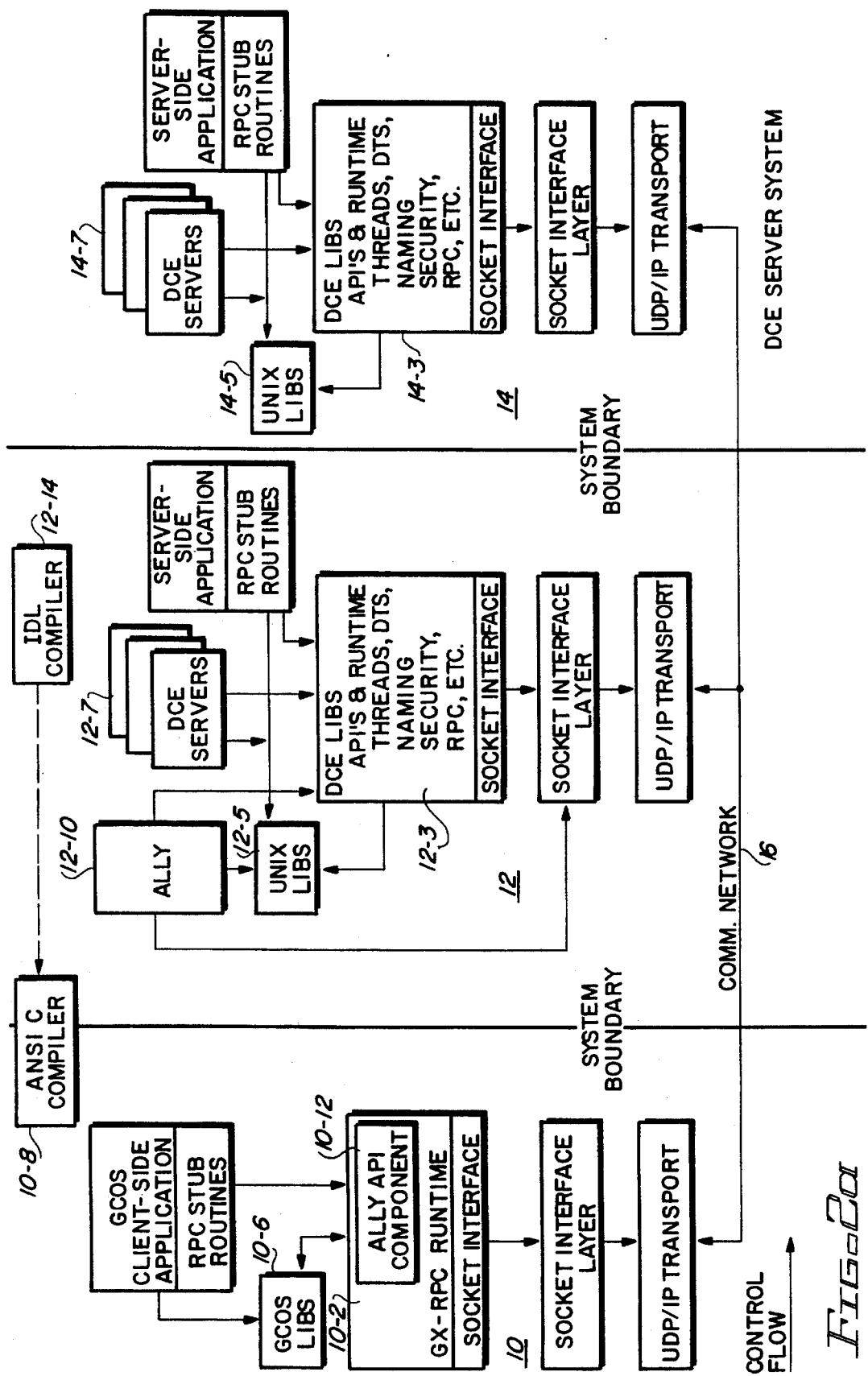

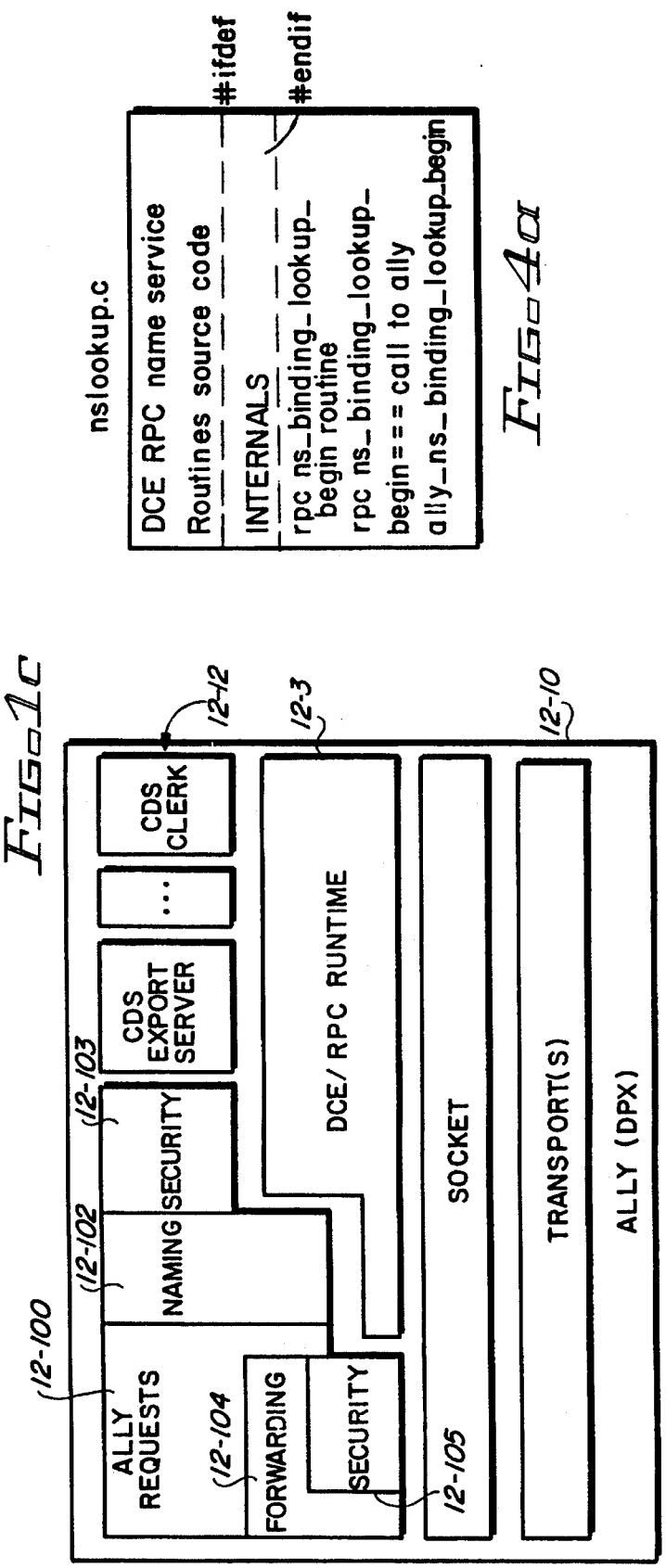

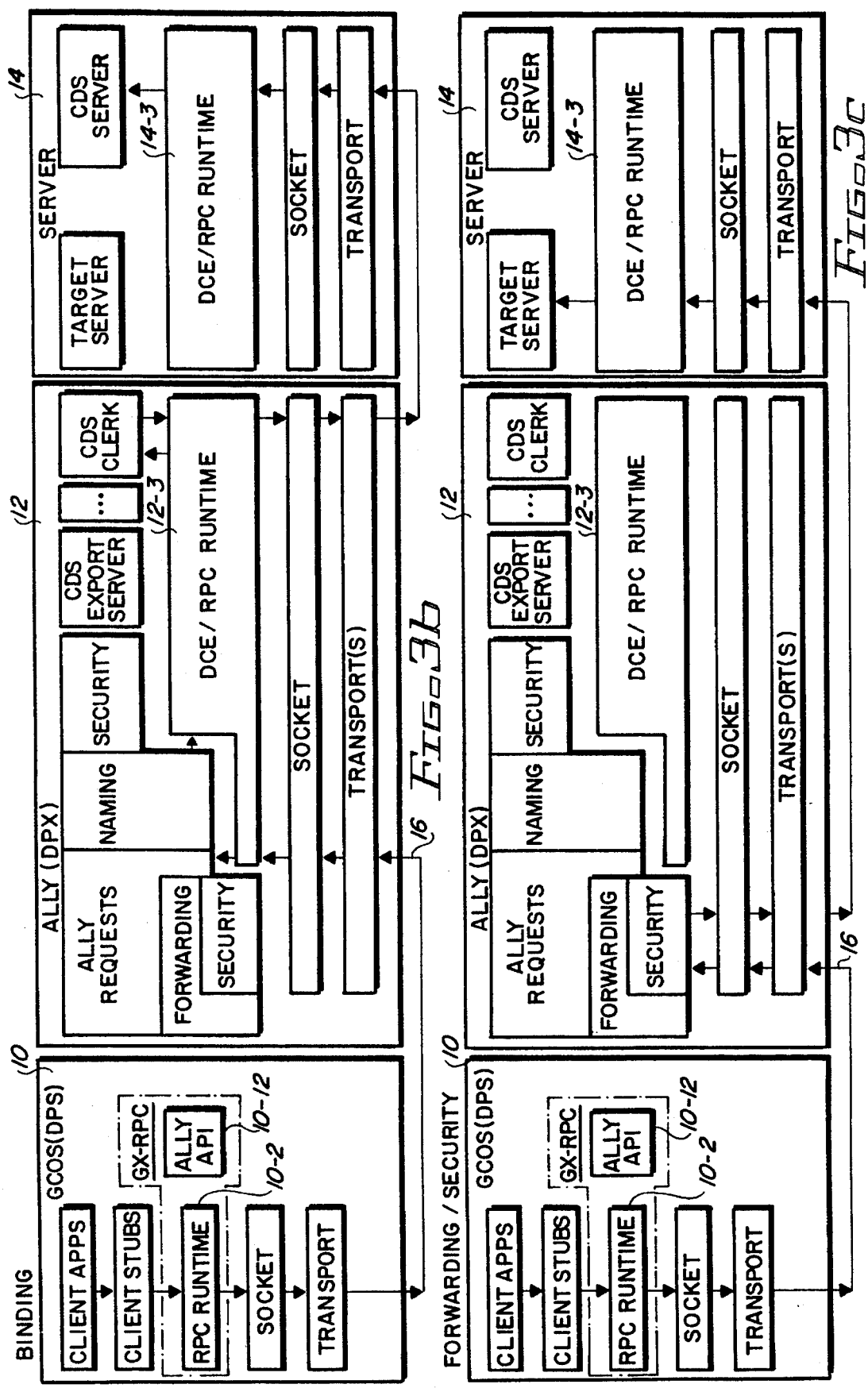

| GCOS CLIENT SYSTEM | ALLY SYSTEM | DCE SERVER SYSTEM |
|---|---|---|
| 2. GX-RPC runtime accesses client system config. file to obtain ally address.<br>3. GX-RPC runtime determines that the requsted local service is not available on client system (not ported) and invokes ally API component.<br>4. Ally API component via client stub sends ally request (ally binding info.) in accordance with ally interface. | 1. The ally registers its interface, endpoints, & bindings with rpcd.<br><br>5. Ally receives request via RPC runtime and transfers request to the designated ally manageement routine defined by the ally request.<br>6. The designated manager routine calls the appropriate ally service routine which translates the request parameters into a standard DCE RPC call to the designated DCE server for providing the requested service.<br>7. Send RPC call to DCE server. | 8. Server receives RPC call from the ally.<br>9. DCE server returns results, if any, via RPC to ally. |

| | FROM FIG. 4b | |
|---|---|---|
| 13. Client application receives result via client stub and provides data to the requestor (e.g. client, runtime). | 10. Ally service routine receives response from designated server.<br>11. Ally service routine copies the result for forwarding to the client application.<br>12. Ally server stub returns result via RPC runtime to client system. | |

*FIG. 4c*

ALLY MECHANISM FOR INTERCONNECTING NON-DISTRIBUTED COMPUTING ENVIRONMENT (DCE) AND DCE SYSTEMS TO OPERATE IN A NETWORK SYSTEM

BACKGROUND OF THE INVENTION

1. Field of Use

This invention relates to data processing systems and more particularly to systems which operate in a distributed computing environment.

2. Prior Art

In the 1980's, computer hardware vendors have responded to the need to provide users with access to UNIX* based systems. Some vendors have provided such access by interconnecting or integrating their proprietary systems with UNIX based systems through the use of separate processor boards and separate operating systems. An example of this type of system is described in U.S. Pat. No. 5,027,271 entitled "Apparatus and Method for Alterable Resource Partitioning Enforcement in a Data Processing System having Central Processing Units using Different Operating Systems" which issued on Jun. 25, 1991.

* UNIX is a registered trademark of X/Open Company Limited

Other approaches include hosting an UNIX environment or process running under a proprietary system and providing external communication/networking functions implemented on a UNIX based platform. These systems allow end user UNIX based systems to use client software to request services from proprietary systems. Examples of these systems are The OPEN7 and OPEN8 systems manufactured by Bull HN Information Systems Inc.

With the continued increases in the speed and power of computer hardware and the development of high speed local area networks, it becomes even more important to be able to combine large numbers of different vendor systems and high speed networks. Such systems are called distributed systems in contrast to centralized systems. The above mentioned OPEN7 and OPEN8 systems are also examples of such distributed systems. Such systems are more economical, provide greater total computing power and provide greater reliability than centralized systems.

However, there are certain problems associated with such systems in terms of the lack of distributed software, network communications and message security. In 1990, the Open Software Foundation, Inc. (OSF), a consortium of computer vendors, announced its choice of a set of integrated services that would provide a comprehensive Distributed Computing Environment (DCE) for the development, use and maintenance of distributed applications without regard to the underlying complexity of the computing network. The DCE architecture is described in the publications entitled, "OSF Distributed Computing Environment Rationale" by Open Software Foundation, Inc. dated May 14, 1990 and "Distributed Computing Environment, An Overview" by Open Software Foundation dated January, 1992.

The DCE architecture envisions support from a platform like a UNIX based platform which includes facilities utilized by such architecture. This poses problems for those vendors which wish to offer such services on a non-UNIX based platform. This problem is further compounded when a vendor wishes to provide such DCE architecture on several different proprietary platforms.

In general, the approach has been to port a substantial number of software services from the proprietary system platform to the UNIX based system platform or visa versa or the addition of special hardware facilities and software for running the UNIX based operating system in another environment. This has proved quite costly and has required the allocation of substantial resources. Additionally, these system platforms have required continuous support in order to provide timely upgrades and enhancements.

Accordingly, it is a primary object of the present invention to provide a technical solution which allows DCE services to provided in an incremental way on a proprietary system platform.

It is a further object of the present invention to provide such incremental services in a timely fashion on several different proprietary system platforms.

SUMMARY OF THE INVENTION

The above objects and advantages are achieved in a preferred embodiment of the distributed system of the present invention. The distributed system includes a non-distributed computer environment (DCE) computer system and at least one DCE computer system which are loosely coupled together through a communications network operating with a standard communications protocol. In the preferred embodiment, the non-DCE and DCE computer systems operate under the control of a non-UNIX/proprietary and UNIX based operating systems respectively. The non-DCE computer system further includes application client software for providing access to the DCE service components via a remote procedure call (RPC) mechanism obtained through the ally software included on the DCE computer system.

According to the present invention, the distributed system further includes three major components which are distributed between the non-DCE and DCE systems. The components are a client side RPC runtime service component which includes an ally application program interface (API) component and an ally component. The arrangement allows non-DCE user distributed applications through client and server software to access DCE service components through the ally component using the RPC mechanism of the non-DCE and DCE systems.

According to the present invention, only those DCE service components which are absolutely necessary are ported to run on the non-DCE system. Other non-ported services are imported from the Ally component through the application program interface (API) component of the non-DCE computer system.

In the present invention, a plurality of APIs are defined for the ally component and are "exported" to the client RPC runtime service components. These APIs are contained in the API component included in the client RPC runtime on the non-DCE system and define the functions required to be performed by the ally component in providing the client application access to the DCE services through the RPC mechanisms of both the non-DCE and DCE systems. According to the present invention, the client application containing the IDL descriptions of the Ally interfaces/specifications are translated into client stub source code by an IDL compiler resident on the DCE system. To complete the building of the client application, a non-DCE system compiler is then used to compile and link the client stub source code with the client RPC runtime component routines on the non-DCE system.

The components of the non-DCE system implemented according to the present invention are partitioned into two parts: a common porting kit and a platform porting kit. The common port kit includes components common to all non-DCE systems and just has to be ported once to the non-DCE reference system. The platform porting kit includes the components which are specific/unique to each non-DCE system and the kit modified when moving from one non-DCE system to another. For example, the platform porting kit includes the RPC runtime environment dependencies, network data representation, import library and communication interface protocols. The common porting kit includes the client RPC runtime common portion, the ally and the API libraries.

Such partitioning allows all of the different nonDCE systems to be implemented in parallel. Also, it reduces cost in upgrading since the common porting kit need only be changed once for all systems. The use of separate platform porting kits permits modifications to made to different systems without affecting any of the other systems.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 1a shows the major components of the distributed computing environment (DCE) architecture included in the preferred embodiment of the present invention.

FIGS. 1b through 1d show in greater detail, the DCE RPC component service of FIG. 1a.

FIG. 1e shows a prior art distributed system configured to perform a DCE RPC operation.

FIG. 2a shows in block diagram form, a distributed system which incorporates the components of the present invention.

FIG. 2b shows in greater detail, the ally component of FIG. 2a.

FIGS. 3a through 3c are flow diagrams which diagrammatically illustrate some of the operations performed by the systems of FIG. 2a.

FIGS. 4a through 4c are diagrams used to illustrate the operation of the preferred embodiment of the present invention.

GENERAL DESCRIPTION OF DCE ARCHITECTURE

FIG. 1a illustrates the OSF DCE architecture used in the system of the present invention. As shown, DCE includes a set of server components for providing distributed services that support the development, use and maintenance of distributed applications in a heterogeneous networked environment. The server components include a remote procedure call (RPC) service component including presentation service, a Naming (Directory) service component, a Security service component, a Threads service component, a Time service component and a Distributed file system service component.

The RPC service component is an access mechanism which implements the model of the simple procedure call within the client/server architecture for allowing programs to call procedures located on other systems without such message passing or I/O being at all visible to the programmer. The DCE RPC service component enables distributed applications to be defined and built in an object oriented way.

Remote procedures are viewed as operations on objects (e.g. printers, files, computing units) rather than as calls to particular systems or server processes. As discussed herein, it hides from the programmer various network complexities such as the means for locating and accessing host systems on which the required services are running. It also makes it easier to produce programs that are less dependent on system configurations such as host names and locations. The RPC service component service design is based on the Apollo Network Computing System (NCS) which provides a clearly specified RPC protocol that is independent of the underlying transport layer and runs over either connectionless or connection oriented lower layers.

The RPC service component consists of both a development tool and a runtime system/service (RTS). The development tool consists of a language (and its compiler) that supports the development of distributed applications following the client/server model. It automatically generates code that transforms procedure calls into network messages. The development tool is discussed later herein with reference to FIG. 1d to the extent necessary for an understanding of the present invention.

The RPC runtime service/system implements the network protocols by which the client and server sides of an application communicate. Also, DCE RPC includes software for generating unique identifiers which are useful in identifying service interfaces and other resources.

The DCE Directory or Naming Service component is a central repository for information about resources in the distributed system. Typical resources are users, machines, and RPC-based services. The information consists of the name of the resource and its associated attributes. Typical attributes could include a user's home directory, or the location of an RPC-based server. The DCE Directory Service comprises several parts: the Cell Directory Service (CDS), the Global Directory Service (GDS), the Global Directory Agent (GDA), and a directory service programming interface. The Cell Directory Service (CDS) manages a database of information about the resources in a group of machines called a DCE cell. The Global Directory Service implements an international standard directory service and provides a global namespace that connects the local DCE cells into one worldwide hierarchy. The Global Directory Agent (GDA) acts as a go-between for cell and global directory services. Both CDS and GDS are accessed using a single directory service application programming interface (API) and the X/Open Directory Service (XDS) API.

The DCE Security Service component provides secure communications and controlled access to resources in the distributed system. There are three aspects to DCE security: authentication, secure communication, and authorization. These aspects are implemented by several services and facilities that together comprise the DCE Security Service, including the Registry Service, the Authentication Service, and Privilege Service, the Access Control List (ACL) Facility, and the Login Facility. The identity of a DCE user or service is verified, or authenticated, by the Authentication Service. Communication is protected by the integration of DCE RPC with the Security Service-communication over the network can be checked for tampering or encrypted for privacy. Finally, access to resources is controlled by comparing the credentials conferred to a user by the Privilege Service with the rights to the resource, which are specified in the resource's Access Control List. The Login Facility initializes a user's security environment, and the Registry Service manages the information (such as user accounts) in the DCE Security database.

The DCE Threads Service component supports the creation, management, and synchronization of multiple threads of control within a single process. This component is conceptually a part of the operating system layer, the layer below DCE. If the host operating system already supports threads, DCE can use that software and DCE Threads is not necessary. However, not all operating systems provide a threads facility, and DCE components require that threads be present, so this user-level threads package is included in DCE.

The Distributed File System Service component allows users to access and share files stored on a File Server anywhere on the network, without having to know the physical location of the file. Files are part of a single, global namespace, so no matter where in the network a user is, the file can be found using the same name. The Distributed File Service achieves high performance, particularly through caching of file system data, so that many users can access files that are located on a given File Server without prohibitive amounts of network traffic and resulting delays. DCE DFS includes a physical file system, the DCE Local File System (LFS), which supports special features that are useful in a distributed environment. They include the ability to replicate data; log file system data, enabling quick recovery after a crash; simplify administration by dividing the file system into easily managed units called filesets; and associate ACLs with files and directories.

The DCE Time Service component provides synchronized time on the computers participating in a Distributed Computing Environment. DTS synchronizes a DCE host's time with Coordinated Universal Time (UTC), an international time standard.

THE DCE RPC RUNTIME SYSTEM ARCHITECTURE

FIG. 1b shows in greater detail, the DCE RPC run time system (RTS). As shown, the system is divided into three major components. These are the Communication Services (CS), Naming services (NS), and Management services (MS). The CS is responsible for carrying out the actual work being done when a remote procedure is called. That is, it accesses the network and provides the means for simultaneously executing different transport and RPC protocols. As shown, the CS includes a network address family extension services section, a common communication services section, a RPC protocol machines section and a common network services section which contains network independent functions such as read, write, open and close.

The network address family extension services section provides functions for manipulating addresses within separate modules for each network service which present the same interface to the CCS. Whenever a network specific operation such as returning the endpoint in a network address needs to be performed, the CCS makes the corresponding function call causing the activation of the specific module determined during initialization time. The RPC protocol machines provides functions for handling different protocols. The hiding of two supported RPC protocols, connection oriented or connectionless (datagram) based is achieved in the same way as described above. For each RPC protocol machine, an initialization routine returns function pointer arrays which present a common interface to the CCS. The CCS uses them to make data transfer calls, collect statistics, access the relevant fields in the binding representation structure and notify the RPC protocol machine of network events.

The NS accesses the distributed system's naming service such as an X.500 directory to locate servers by specifying an interface or an object which have to be exported by servers and imported by clients. The NS manages RPC services either locally or remotely. Remote management functions are a subset of local ones and are made available via the RPC mechanism.

FIG. 1c shows the CCS in greater detail. As shown, the CCS includes an initialization service component, a thread service component, a call service component, a network listener service component, a binding service component, a security service component, an interface service component, an object service component, a communications management service component and a utility service component.

The initialization service component sets up the RPC environment and the creation of prerequisites for communication services such as the allocation of static tables. Also, transport and RPC protocols to be supported are also established. A table is generated during initialization that assigns an identifier (RPC protocol sequence id) to each combination of network, transport and RPC protocols. These types of identifiers appear later as attributes to structures that specify interfaces. Thus, an interface representation data structure may exist several times for the same interface but with different protocol sequence identifiers associated with it. When the RTS library is build as a non-shared image, the initialization routines are called when either the application or stub first calls the CS.

The thread service component contains functions for manipulating threads such as creating and destroying them. It also manages a table that keeps track of a thread's status and relates it to the RPC context it is executing. In the DCE RPC implementation, there is a client call thread for each request an application makes. This thread executes all of the stub and CS code. When all of the parameters are marshalled and passed to the network, the client thread is blocked until the result of the call is returned.

The call service component provides functions of sending and receiving data. It also manipulates the call handle data structure which serves as a parameter for all the functions in the component. The important components of this structure are the binding representation structure which contains information about the remote partner, interface and operation identification, a thread identifier, dynamic information such as the employed transfer syntax, and RPC protocol specific information. The other parameter common to the call service functions is the I/O vector which is an array of buffer descriptors. The buffers pointed to in the I/O vector provide the memory for the marshalled data. The routines in the call service are used to start and end transfers or to send and receive data. Data is sent or received in fragments for larger quantities of data these calls have to be repeated until all the data is processed, There is a special call that is utilized to indicate to the remote RPC process that the last chunk of data belonging to the same request or response is being sent.

The network listener service component detects events on any network and delivers them to the correct RPC protocol manager (PM). It accesses an internal table where network descriptors are related to RPC protocol sequences (transport and RPC protocols). It manages that table (add, delete operations) as well as monitors the network itself. For example, it checks the liveliness of the remote partner in the case a connectionless protocol is employed. The network listener service component further manages the network listener thread (creation, termination, notification of events).

The binding service component provides functions to manipulate the binding representation data structure or binding handle. A client makes a request to the naming service to first obtain this structure. The binding handle contains information that relates a client to the server process. It consists of the location of the server the entire presentation address consisting of the server network address and the communication port of the server process), an object identifier, an interface identifier and further RPC protocol specific information. This structure is pointed to in the call handle which is part of every function in the call service component.

The RPC security service component provides for the selection of four levels of security. These are the performance of authentication on every association establishment, the performance of authentication on every call, the enforcement of integrity on every packet and the enforcement of privacy on every packet. The interface service component includes functions to handle the internal interface registry table which keeps track of all of the interfaces registered with CCS. It contains interface uuids, version numbers and operation counts.

The object service component manipulates another internal table that relates objects to the types to which they belong. Particular objects include servers, server groups and configuration profiles. The communication management service component includes functions for managing all of the CS: CCS, network services, and the RPC protocol services. This includes processing incoming calls, indicating how fault messages should be treated, allowing or barring shutdowns, and gathering statistics. The utility service component includes the functions for handling uuid, timers and buffers.

The RPC naming service component of FIG. 1b provides the following groups of services: operations for manipulating binding handles, none of which imply communications between the client and server (e.g. export, import, lookup); operations for retrieving information about entries in general (e.g. interfaces and objects exported by a server); operations on server groups (e.g. create, delete, add, remove members); operations on profiles; and interfaces for managing applications for creating or deleting name service entries in a consistent manner.

The Management Service component of FIG. 1b provides functions that can only be used by an application to manage itself locally and functions that can be called to manage remote RPC based applications. In the case of the latter, an application to be managed has to make itself available by calling the appropriate run-time functions. An application can control remote access to its management interface through authenticated RPC services. Examples of local management services are calls to inquire about or set time-out values for binding handles or alerts. Examples of remote management functions are to determine whether a server is listening for incoming calls, start/stop listening on a server or collect statistics.

RPC SERVICE COMPONENT ARCHITECTURE

FIG. 1d shows the basic components of the DCE RPC service component. As previously mentioned, this component consists of both a development tool and the runtime system described in connection with FIG. 1c. The development tool includes an UUID generator, the RPC Interface Definition Language (IDL) and an IDL compiler. The RPC runtime system includes a client or server application, an RPC stub interface, an RPC runtime interface and the RPC runtime system (RTS) which includes the previously described components.

Development Tool

The UUID generator is an interactive utility that creates UUIDs (universal unique identifiers). The significance of a given UUID depends entirely on its context and when the UUID is declared in the definition of an interface, it defines that interface uniquely from all other interfaces.

A specific RPC interface is written in IDL which is a high level descriptive language whose syntax resembles that of the ANSI C programming language. The DCE RPC interface definition contains two basic components. One is an interface header including an RPC interface header which contains an interface UUID, interface version numbers and an interface name, conveniently chosen to identify the interface or its function. The second component is an RPC interface body which declares any application specific data types and constants as well as directives for including data types and constants from other RPC interfaces. This component also contains the operation declarations of each remote procedure to be accessed through the interface which identifies the parameters of a procedure in terms of data types, access method and call order and declares the data type of the return value, if any.

Using IDL, the programmer writes a definition of an RPC interface for a given set of procedures. The RPC interface can be implemented using any programming language provided that the object code is linkable with the C code of the stubs and the procedure declarations conform to the operation declarations of the RPC interface definition and the calling sequences are compatible.

The IDL compiler processes the RPC interface definitions written in IDL and generates header files and stub object code or source code for stubs written in ANSI C. The generated code produced by the compiler from the RPC interface definition includes client and server stubs that contain the RPC interface. The compiler also generates a data structure called the interface specification which contains identifying and descriptive information about the compiled interface and creates a companion global variable, the interface handle which is a reference to the interface specification. Each header file generated by the IDL compiler contains the reference that the application code needs to access the interface handle and allows the application code to refer to the interface specification in calls to the RPC runtime. The runtime operations obtain required information about the interface such as its UUID and version numbers directly from the interface specification. For further information about the IDL syntax and usage, reference may be made to the publication entitled OSF™ DCE Version 1.0 DCE Application Development Guide published by the Open Software Foundation, Copyright 1991.

STANDARD DCE SYSTEM FOR IMPLEMENTING RPC CALLS

FIG. 1e illustrates the basic system configuration which implements typical RPC calls in a DCE system. As previously mentioned, the IDL compiler generated a pair of stub files, one for the client and one for the server, for a given application which is installed on the same system or on separate systems as shown in FIG. 1e. The client and server stub files consist of RPC routines that handle all of the mechanical details of packaging (marshalling) and unpackaging (unmarshalling) data into messages to be sent over the network, the handling of messages, such as sending and receiving of such messages and all other details of managing network communications, all as defined by the specifications made in an .idl file which defines the set of remote operations that constitute the interface.

The server implementations of remote operations are written in C source code which is compiled and then linked to the server stub code and DCE library. The interfaces to these remote operations are defined and characterized in the IDL language in the .idl file. The client implementations of the same remote operations are also written in C source code which is compiled and then linked to the client stub code and DCE library. In FIG. 1e, the above compilations occur on the two DCE client and server systems.

As shown, both systems include UNIX libraries which contain the standard routines for handling socket calls (e.g. accept, ioctl, listen), file manipulation functions (e.g. open, close, read, write), standard I/O functions (e.g. print, open, get), memory management and exception handling functions (e.g. free, malloc, realloc) as well as other operations. Also, the client and server systems of FIG. 1e include a number of DCE servers for executing different procedures or services for a user application program. The client DCE servers normally perform local services for client application program such as naming or directory services, security services and, time services. The DCE servers may perform remote services for client application programs such as print services, file services, calendar services, administrative services, etc.

The client side of the application is usually implemented as a library wherein the client side of the application consists of a call to a routine that executes (sending the request over the network and receiving the result) and then returns and continues whatever else it was doing. The server side of the application is a dedicated process that runs continuously waiting for a request, executing it and returning the answer, then waiting for the next request, etc.

As shown, the DCE servers have access to the UNIX libraries and to the various DCE libraries, APIs and DCE service components previously described herein (i.e., threads, DTS, naming/CDS, security and RPC ). In each system, DCE system or layer is layered on top of its local operating system and networking software. As shown, DCE is layered over a transport level service such as UDP/IP transport service which is accessed through a transport interface such as sockets. The implementation of the DCE system of FIG. 1e is dependent upon the use of the Internet Protocol (IP) and socket networking services and UNIX operating facilities.

FIG. 1e also shows the control flow for an RPC call. This operation is performed as follows. The client's application code (Client-side application) makes a remote procedure call, passing the input arguments to the stub for the called RPC interface (RPC stub routines). The client's stub (RPC stub routines) marshalls the input arguments and dispatches the call to the client DCE RPC runtime. The client's DCE RPC runtime transmits the input arguments over the communications network (i.e., via the socket interface, socket interface layer and UDP/IP transport service) to the server's DCE RPC runtime.

The server's DCE RPC runtime dispatches the call to the server stub (RPC stub routines) for the called RPC interface. The server's stub (RPC routines) uses its copy of the RPC interface to unmarshall the input arguments and pass them to the called remote procedure (DCE servers). The procedure executes and returns any results (output arguments or a return value or both) to the server's stub (RPC stub routines). The server's stub (RPC stub routines) marshalls the results and passes them to the server's DCE RPC runtime. The server's DCE RPC runtime transmits the results over the communications network to the client's DCE RPC runtime which dispatches the results to the client's stub (RPC stub routines). The client's stub (RPC stub routines) uses its copy of the RPC interface to unmarshall the output arguments and pass them to the calling application (Client side application).

SYSTEM OF PREFERRED EMBODIMENT

FIG. 2a shows in block diagram form, a distributed system constructed according to teachings of the present invention. As shown, the system includes a non-DCE system 10, a DCE (ally) system 12 and a DCE server system 14 which are loosely coupled together by a conventional communications network 16. The non-DCE system 10 contains an API import library component 10-12 and a client only RPC runtime component 10-2 (GX-RPC) constructed according to the teachings of the present invention. As shown, the component 10-2 includes an ally API component 10-12. The ally API component 10-2 contains the special routines for accessing DCE based services on systems 12 and 14 directly or indirectly through the ally on system 12 as described herein. That is, the ally API component 10-12 enables client applications to access DCE based service components without having to implement such components on the non-DCE client system 10.

The GX-RPC runtime component 10-2 contains the necessary runtime routines for initiating RPC requests to ally system 12 through ally API 10-12 on behalf of client local requests for providing access to the DCE services available on systems 12 and 14. That is, the GX-RPC runtime component 10-2 is responsible for reliably and transparently forwarding requests which originate as local requests and receiving responses from such servers through the ally system.

The non-DCE system 10 also includes a GCOS library 10-6 which contains procedures for processing standard operating system calls by an application to the operating system facilities. Also, the library 10-6 is made accessible to the ally API component 10-12 for accessing client platform facilities (e.g. configuration files) to the extent necessary. Lastly, the system 10 includes a conventional ANSI C compiler 10-8 for compiling and linking client side application programs and client RPC stub source routines as explained herein.

System 12 is a DCE system which includes all of the DCE service components of block 12-3 (e.g. DCE libraries, DCE APIs and DCE RPC runtime component), the DCE servers of block 12-7 and the UNIX libraries of block 12-5. According to the teachings of the present invention, the system 12 also includes an ally component 12-10. The ally component 12-10 operatively couples to the DCE components of block 12-3 and to the UNIX libraries of block 12-5. It is responsible for taking in the requests from the ally API routines of block 10-12 running on system 10 and then invoking the actual APIs available on ally system 12 (i.e., converts ally RPC calls into actual standard DCE RPC calls). These calls invoke the specific DCE servers of block 12-7 as explained herein in greater detail.

In the preferred embodiment, the non-DCE system 10 corresponds to a DPS system which operates under the control of the GCOS operating system and the DCE system 12 is a DPX system which operates under the control of the BOS operating system. Both of these systems are marketed by Bull HN Information Systems Inc. The system 14 can be any DCE based system which includes the standard UNIX based operating system and DCE server application software.

ALLY COMPONENT

FIG. 2b shows in greater detail, the ally component of block 12-10. As shown, the ally component 12-10 includes a plurality of subcomponents 12-100 through 12-104. These correspond to an ally request/DCE service subcomponent 12-100, an ally naming service subcomponent 12-102, an ally security service subcomponent 12-103, an ally forwarding service subcomponent 12-104 which includes an ally security service subcomponent 12-105. Each subcomponent includes the different routines required for performing DCE services on behalf of the client application running on system 10 for requests that are normally handled locally according to the present invention.

The request subcomponent 12-100 processes requests for DCE related services such as getting binding handles and requests that the client RPC runtime component 10-2 sends to the ally component for miscellaneous services (e.g. initialization, etc.). The naming subcomponent 12-102 handles naming service requests received from the client RPC runtime component 10-2. The ally security service subcomponent 12-103 handles requests for security services made by the client RPC runtime component 10-2.

The ally forwarding service subcomponent 12-104 provides communication facilities for handling requests made by the client RPC runtime component 10-2 enabling access to target servers when the requests are required to be processed by the ally component due to the nature of the type of request (e.g. differences in the communications protocols supported by the target server and the client system, or the security requirement, etc.). The security subcomponent 12-105 of the forwarding subcomponent 12-104 is used when the ally is acting as a proxy. This subcomponent performs the necessary operations on the request being forwarded to the target server to meet the specified level of security. The functions performed by the ally subcomponents will now be considered in greater detail.

Ally Binding Services Subcomponent

In the DCE system of FIG. 1e, before any client program can call a server function, it must first establish a binding to the server. This is done by acquiring a binding handle from the DCE RPC runtime component. A binding handle contains information about the communications protocol that a server uses, the address that the server is listening on, and optionally, the endpoint that the server is listening on. A binding handle may also contain information about security and object-oriented features of the DCE RPC runtime component.

A binding handle is acquired through one of two techniques: string binding and the DCE naming service. String binding is used to convert a string representation of the binding handle to an actual binding handle. In the DCE system of FIG. 1e, the DCE naming service is used to look up servers in the name space and return appropriate binding handles to them.

In the system of the present invention, the acquisition of a binding handle by a GCOS client program requires some interaction with the ally component 12-10, to allow the ally to perform/support the security and forwarding services. By way of example, to create a binding handle from a string binding, the client program provides a string representation of the binding to the client RPC runtime component. The client GX-RPC runtime component 10-2 then extracts the appropriate information from the string such as network type, network address, and endpoint.

It is possible to perform this operation entirely on the client system 10 without any interaction with the ally component 12-10 by including the mechanism that the client uses to create its service association with the ally component 12-10. However, this would limit the client program to using only those communications protocols supported by client system 10. This could severely restrict the client system's access to servers.

In the preferred embodiment of the present invention, the ally forwarding service subcomponent 12-104 is used to carry out the above binding operation for the client system 10. If the client system finds that the binding can not be supported by the client's GX-RPC runtime component 10-2, it calls the ally component 12-10 with the string binding. The ally 12-10 then tries to create a binding handle to the target server, using its own RPC runtime component 12-3. The ally component RPC runtime component 12-3 determines whether the ally 12-10 has access to the target server, and created a binding handle wherever possible. The proxy binding created by the ally component 12-10 is provided to the forwarding service subcomponent 12-104 which returns this proxy binding handle back to the client system 10. Thereafter, any calls that the client system makes using the binding handle passes through the ally component 12-10 to the actual target server.

Another service provided by the ally which affects the binding calls is the ally security service. Again, this is a case where the ally component must return a proxy binding to the client runtime system so that all traffic passes through the ally's security service subcomponent 12-103. In a DCE system of FIG. 1e, security levels are associated with binding handles. In system 10, when the client sets a security level on a binding handle, the client system 10 GX-RPC component 10-2 passes the binding handle to ally component 12-10. If the ally component 12-10 was not already providing a forwarding service for the particular binding, the ally component 12-10 creates a new endpoint for the client to bind to, and returns a new binding handle to the client system via the RPC runtime component 12-3. The ally component 12-10 then applies through its forwarding security subcomponent, the specified security level to any messages that are passed on the binding handle which are in turn forwarded to the target server.

Ally naming services subcomponent

In the DCE system of FIG. 1e, an integrated access to the Cell name space by is provided by integrating the Cell Directory Service (CDS) or more specifically, the CDS clerk, into the DCE RPC runtime component. These calls can be divided into two categories: binding imports and name space manipulation. The binding import API is used to import binding information from the cell name space. The name space manipulation routines are used to manage the cell name space by performing such functions as creating entries, groups or profiles, placing entries into groups, etc.

In the system of the present invention, the ally component 12-10 performs all naming API operations which are integrated into the DCE RPC runtime component. This is done since no Cell Directory Service (CDS) code (i.e., CDS clerk) is ported to the client system 10 and that the Ally component may supply proxy bindings to the client system 10 when performing forwarding and security services on behalf of the client system. As described herein, performance sensitive rpc_ns_*() functions such as binding, their resolution is carried out as fast as possible by importing such RPC naming service APIs. The following describes such API functions in greater detail.

rpc_ns_binding_* function

In the DCE system of FIG. 1e, the client runtime component uses the rpc_ns_binding_* functions to locate servers and import their binding handles from the name space. These functions pass an interface-UUID and optionally, an object-UUID, to the name space access functions and expect back one or more binding handles to servers that provide the specified interface.

In the system of the present invention, when the client runtime component 10-2 calls an rpc_ns_binding_* function, the runtime component 10-2 determines that it is unable to perform the function and issues an RPC call to the ally component 12-10 in which it provides the interface-UUID, version number, and object-UUID. Upon seeing the request from the client system 10, the ally component 12-10 issues the appropriate DCE rpc_ns_binding_* call to its RPC runtime component 12-3 (i.e., the ally component has full access to the DCE service components).

When the call returns, the ally component 12-10 converts the binding handle to its string representation and returns it to the client system 10 as the result of the remote procedure call. The ally component 12-10 next sorts the contents of the binding vector table to place those handles directly accessible to the client system 10 at the front of the vector. This facilitates the client system 10 in being able to perform direct RPCs to target servers. The client system 10, upon receiving the response, attempts to form a binding handle from the string binding. This operation may require further interaction with the ally component 12-10 to have the ally provide the appropriate forwarding service. From this point on, the binding operation is handled like the string binding operation.

Security considerations may be involved in the ally's handling of rpc_ns_binding_* functions. In the DCE system, a client application program is allowed to specify a security level on an interface, and optionally, an object. This is done by passing the appropriate interface-UUID and object-UUID to the rpc_if_register_auth_info() call function. This call has the effect of automatically associating a security level to any binding handles allocated to this interface as discussed herein.

In the system of the present invention, when the ally component 12-10 detects that the requested call is for a secure interface, it returns a proxy binding handle to the client system 10 which forwards all packets through the ally forwarding security service subcomponent 12-104. The ally subcomponent 12-104 then associates the specified security level with the binding handle so that any traffic on this binding handle will have the appropriate security level applied. Since the import function can return more than one binding handle, the ally component 12-10 maps the security service's binding handle to a list of actual server binding handles. When the first RPC request comes in from the client system 10 to the proxy binding handle, the ally component 12-10 selects one of the bindings from the vector table. The selected binding is used or remains in effect until either the proxy binding handle is freed, or the endpoint is unmapped.

Ally forwarding service subcomponent

The Ally forwarding service subcomponent 12-104 is used to give the client more access to servers by acting as a forwarding agent for the client system. This subcomponent service allows the client system 10 to communicate with servers even if the client and server do not share a common communications protocol. However, the forwarding service requires that the client system 10 and Ally component 12-10 share a common protocol and that the Ally component 12-10 and server share a common protocol. As discussed above, the Ally forwarding service subcomponent is configured through the use of the Ally binding service or Ally request subcomponent 12-100. When the client system detects that the it unable to reach a given server, it forwards the binding handle to the Ally's binding service subcomponent 12-100 to see if the Ally component is able to make the connection. The Ally component 12-10 determines if it is able to communicate with the server by attempting to bind to the server. If this binding succeeds, the Ally component 12-10 creates a proxy binding to the forwarding service subcomponent 12-104 which is then returned to the client system 10.

The proxy binding represents a transport endpoint that is managed by the forwarding service subcomponent 12-104. The forwarding service subcomponent 12-104 passes any RPC packets coming into this endpoint on to the actual server. It also passes any responses, callbacks, etc. back to the client system GX-RPC runtime component 10-2. To provide this capability, the forwarding service subcomponent 12-104 is given access to the entire RPC packet header, so that it may be forwarded intact to the server. This is achieved by having the forwarding service subcomponent 12-104 connected to listen directly to a transport endpoint.

Each endpoint, or proxy binding, that the ally forwarding service subcomponent 12-104 manages will be associated to the actual binding handle of the target server. When an incoming packet from the client system 10 is detected on the proxy binding, the ally forwarding service subcomponent will read the packet. Based upon the proxy binding that the packet came in on, the ally then determines the target address of the server, and forwards the packet to the server. Similarly, a packet coming from the server to the ally will be forwarded through this proxy binding to the client system 10.

When using the datagram service, the GX-RPC runtime component 10-2 is able to multiplex the ally to server messages over the one ally transport endpoint. This requires that the ally record the activity-UUID of every client to ally message. The forwarding service subcomponent 12-104 then uses this activity-UUID to demultiplex the incoming messages from the server so they may be forwarded to the client system 10.

For a connection-oriented service, the ally component 12-10 establishes a connection to the remote server. The forwarding service subcomponent 12-104 forwards messages between these two connections. The ally component 12-10 handles connections being dropped by either the client or server. If either connection is dropped, the ally component 12-10 terminates the corresponding connection. This signals the remote end that there has been a communications failure.

The forwarding service subcomponent 12-104 also manages endpoint mapping for the client application. Binding handles returned from the cell name space usually only contain the network address of the node providing a given service. The actual endpoint at that node is usually not registered in the cell directory service because these entries tend to change frequently. The DCE system supplies a server called rpcd which runs on a well-known port on every server machine. A server normally binds an endpoint and registers it with the rpcd daemon. When a client detects that it does not have an endpoint to bind to on the remote system, it contacts the endpoint mapper on that node to look up the server's endpoint.

When the ally component 12-10 sees a message from client system 10 on the forwarding service subcomponent 12-104, it checks to see if it knows the server's endpoint on the remote system. If the server's endpoint is unknown, the ally component 12-10 contacts the endpoint mapper on the server node, and by passing it the interface-UUID and object-UUID of the server, acquires the endpoint of the server. It uses the endpoint to forward the packet to the server.

The endpoint mapping service is implemented using the DCE/RPC runtime components. The ally component 12-10 imports the client stubs for the endpoint mapper interface. When the ally component 12-10 has to contact the remote endpoint mapper, it first gets a binding handle from the DCE RPC runtime component connected to the remote server's well-known port. This is done as a string binding operation. The ally component then uses this binding handle to call the remote endpoint mapper. Once the server's endpoint is known, the ally component then forwards the packet to the server.

Ally security service subcomponent

The ally security service subcomponent 12-105 is used to allow the client application on client system 10 perform DCE authenticated and authorized remote procedure calls. To provide these services, the client system interacts with the DCE Authentication Service (Kerberos) and the DCE Registry Service. In a DCE system, the client's RPC runtime component utilizes these services to provide the necessary levels of authentication and authorization, as specified by the user, on each packet sent out on a binding handle.

In the client system of the present invention, the GX-RPC runtime component 10-2 has no access to the DCE authentication and authorization services. That is, the client system depends on the ally component 12-10 to add authentication and authorization information to the RPC packets. To enable the ally component to perform this service, the information about what type of authentication and authorization are passed from the client GX-RPC runtime component 10-2 to the ally component. Any traffic associated with a binding handle that has a security level set also passes through the ally component 12-10, meaning the ally's security service is closely tied to the ally's forwarding service subcomponent.

In DCE, there are two interfaces/functions that enable the client application to associate a security level with a binding handle. These functions are rpc_binding_set_auth_info() and rpc_if_register_auth_info(). The first call function takes a binding handle and sets the authorization and authentication information on it. The second call function associates a security level with an interface, and then any binding handles allocated to that interface will automatically inherit the security level. This capability is very useful when dealing with stubs using the [auto_handle] attribute, which causes the client stub to automatically import a binding handle from the name space.

Each of the above interfaces require the client to pass in a set of authorization and authentication credentials. These credentials are acquired by the sec_login_setup_identity() and sec_login_validate_identity() calls/functions. These calls/functions are used to acquire a ticket granting ticket from Kerberos and get authorization credentials from the registry database. These functions are exported by the Ally component 12-10. The DCE RPC security functions also require an authentication level, which specifies what type of authentication (level of trust) will be used between the client and server. These range from unauthenticated to total encryption of all data. An option argument is used as the expected principle name of the server. This allows for the server to be authenticated to the client.

The ally component 12-10 handles the rpc_binding_set_auth_info() call to obtain the necessary security information for the binding. In addition, the binding handle itself (in its string representation) is passed between the client system 10 and ally component 12-10 on this call. Since security requires that all packets be forwarded to the ally component 12-10, the ally determines whether the binding handle was a true binding handle or a proxy binding handle. In other words, the ally component 12-10 sees if it was already providing a forwarding service for this binding handle. If it is, the binding remains unchanged and the ally component 12-10 simply places the security information into its database.

If the specified binding handle was bound directly to the server, the ally component 12-10 allocates a proxy binding handle. The real server address and security information is stored in the ally's database, and the proxy binding handle is returned to the client. Upon receiving the new binding handle from the ally component 12-10, the client converts the handle from a string binding to its internal representation within the GX-RPC runtime component 10-2. In this way, all future calls on the binding handle are transparently forwarded to the ally component 12-10 for security information to be added.

Conversely, if the call to rpc_binding_set_auth_info() was being done to remove any security level from the binding handle, the ally component 12-10 then allows the client system 10 to communicate directly to the server again. This results in the ally component 12-10 removing the proxy binding, and returning the actual server's binding information to the client system.

The rpc_if_register_auth_info() function influences the way the ally component 12-10 handles the binding import requests from the name service. The call/function itself sets the security level for an interface. When any binding handles to that interface are imported from the name space using the rpc_ns_binding_* calls, the binding handles will have the specified security levels associated with them. The ally component 12-10 maintains this information and checks it whenever any rpc_ns_binding_,() calls are performed by the client system 10.

If an rpc_ns_binding_*() call tries to import a binding handle from an interface with a security level set, the ally component 12-10 creates a proxy binding handle to the security service. This is returned to the client application as the imported binding. Meanwhile, the ally component 12-10 places the actual binding, as well as the security information, into its database for the forwarding service subcomponent 12-104 to use.

Whenever a packet arrives at a proxy binding on the ally component 12-10, the forwarding service subcomponent 12-104 checks the database to determine whether the proxy binding has an associated security level. If so, the forwarding service subcomponent 12-104 passes the packet to the security service to have the relevant parts of the message encrypted according to the security information on the binding handle. The new packet is returned to the forwarding service subcomponent 12-104 to be passed on to the server. Similarly, packets transferred from the server to the client are passed through the security service subcomponent 12-103 to decrypt any data for the client system.

The above requires a trusted link between the client system and ally component. That is, all messages between the client and ally are passed in clear text, not encrypted.

Also, one of the arguments to the sec_login_validate_identity() function is the user's private key (password) which is passed cleartext to the ally component.

Request subcomponent/Ally initialization

As mentioned, the ally request subcomponent 12-100 processes initialization requests received from client system 10. As part of the initialization sequence of client system 10, a link is established to the ally component 12-10. This link is the path to the ally's DCE based API. The client system 10, upon establishing this binding, calls a function exported by the ally component 12-10. This function has two effects. First, it verifies to the client system that the binding to the ally system 12 is correct. Second, it enables the ally component 12-10 to establish a client context. The client context contains all information related to a client system that the ally system must track. For example, the client context contains all proxy bindings, security information, forwarding information, etc. The ally system 12 returns a context handle to the client system 10. This context handle is passed on to the ally component 12-10 on all future calls by the client system 10, thus identifying the client on each successive call to the ally component 12-10.

Another initialization function that is exported by ally component 12-10 allows the client GX-RPC runtime component 10-2 to register the list of protocol sequences supported by the client system 10. This enables the ally component 12-10 to filter binding requests in an attempt to find a server binding where the client system 10 may communicate with the server without using the ally's forwarding service subcomponent 12-104. This reduces load on the ally system and increases performance by eliminating unnecessary network transfers.

The FIGS. 3a through 3c illustrate the control flow in processing different types of requests previously discussed made by the client system 10 which are carried out by the ally system 12, according to the present invention. Similarly, summary descriptions of the APIs performed by the ally component 12-10 are set forth in Appendix I.

DESCRIPTION OF OPERATION

With reference to FIGS. 2a through 4c, the operation of the system of a preferred embodiment of the present invention will now be described in processing a specific client request, according to the teachings of the present invention. Prior to such operation, the compilation and installation of the GX-RPC component 10-2, ally API component 10-2, ally component 12-10 and the ally interface specification which produces the client and server RPC stubs will have taken place.

As discussed above, the GX-RPC component 10-2 is constructed to include the minimum amount of code eliminating the need to port a substantial amount of code for specific DCE RPC components which normally reside locally on a DCE based system. The portions of the standard DCE RPC component which have been deleted or modified are designated by #Ifdef statements as explained herein. This eliminates having to port the GX-RPC component each time to run on another platform (e.g. a different GCOS system platform). More specifically, the source code component for each of DCE RPC runtime routines has been modified to designate which parts are no longer being used and which parts include additional code added for having a particular service request performed by the ally system. This enables the GX-RPC component to recognize when a particular service is no longer performed locally and to invoke the necessary operations to cause the service request to be performed by the ally.

FIG. 4a provides an example of how such source code component is modified for particular DCE RPC name service routines included in the DCE RPC component as nslookup.c. The RPC DCE routines contained in this component are used to create and manage contexts for binding lookup operations. According to the present invention, definition statements (i.e., #ifdef, #endif) are included in the portions of the source code file of the nslookup.c component which are to be deleted. As indicated in FIG. 4a, such statements result in the deletion of the internals declarations for all of the locally defined routines in addition to the deletion of other parts of the source code file which correspond to routines that are no longer required to be used.

Additionally, new statements are included in the initial portions of each of the remaining RPC name service routines (e.g. rpc_ns_binding_lookup_begin, rpc_ns_binding_lookup_next and rpc_ns_binding_lookup_done) which appear near the end of the source code file of the nslookup.c component. These new statements cause the DCE request to be handed off to the ally components 12-10 by generating an ally request which is unique in form. The result is that the request is directed to the import API component 10-12 which directs the request to the ally component. For example, the two routines mentioned call ally specific routines designated as ally_ns_binding_lookup_begin, ally_ns_binding_lookup_next and ally_ns_binding_lookup_done.

Examples of portions of the above two routines rpc_ns_binding_lookup_begin, rpc_ns_binding_lookup_next and rpc_ns_binding_lookup_done are included in APPENDIX III. The routine rpc_ns_binding_lookup_begin is used to create a lookup context on the ally system to be used in a search of the namespace for a binding to a specified interface (and optionally, an object) while routine rpc_ns_binding_lookup_next is used to import the next set of binding handles from the ally system. In a similar fashion, the DCE RPC security routines (e.g. sec_login_setup_identity() and sec_login_validate_identity()).

All of the above modified RPC runtime routines are compiled using the IDL compiler on ally system 12. Additionally, the IDL descriptions of the ally interface (file ally.idl) are also compiled. This produces the RPC client and server stub code. As diagrammatically illustrated in FIG. 2a, the client stub code is then transferred to the client system 10 where it is compiled and linked with routines of the GX-RPC component 10-2 including the ally API routines of component 10-12 that provide ally specific functionality (i.e., file comally.c in Appendix III) and the GCOS client_side application. The object code components resulting from the above compilation process are installed on the client system 10.

The ally interface source code generated by the IDL compiler on ally system 12 (i.e., RPC stub routine) is compiled and linked with the server_side application and ally component routines.

Following the above described operations, the systems 10, 12 and 14 of FIG. 2a are initialized. For the most part, the systems are initialized in a conventional manner. That is, the non-DCE system 10 is initialized in the same manner as a DPS system and the GCOS operating system are initialized.

However, the non-DCE client system 10 in addition to loading its system configuration file with the standard system information also loads into the file, parameters designating the address of the ally system 12. As, explained herein, this information is used to establish an association with the ally component 12-10 in accordance with present invention. The DCE based ally system 12 and the server system 14 are initialized in a conventional manner.

With reference to FIG. 4b and 4c, the operation of the preferred embodiment of the present invention will now be described. FIG. 4b and 4c show in general, the operations carried out in response to a standard DCE request made by an application running on client system 10. It will be assumed that the client application makes a call to the directory name services which in the standard DCE system of FIG. 1e would have been processed locally using the DCE naming service facilities available on the system. In the case of the present invention, certain components, such as the directory name services (CDS), do not have to be ported to the client system 10. Accordingly, the client system 10 makes a determination that such services are not available and forwards the request to the ally system 12 for processing.

As part of the initialization of the ally component, the first operation that generally takes place is that the ally component 12-10 registers the ally interface with the DCE RPC runtime component 12-3 (i.e., the RPCD daemon process) via a standard DCE call routine (i.e., rpc_server_register_if function). Registering the ally interface informs the DCE RPC runtime component 12-3 that the interface is available to client system 10 and server 14.

In greater detail, the ally component 12-10 registers its endpoints by placing the following information into the local endpoint map: the RPC interface identifier which contains the interface UUID and major and minor version numbers; the list of binding handles for the interface and the list of ally object UUIDs, if any.

The ally component and stub code establishes a manager entry point vector (EPV) for the interface implemented by the ally. A manager is a set of routines that implement the operations of the ally interface as explained herein. The EPV is a vector of pointers (i.e., a list of addresses—the entry points of the procedures provided by the manager) to functions implemented by the manager. The manager EPV contains exactly one entry point for each procedure defined in the ally interface definition. When an ally RPC request is received, the operation identifier is used to select an element from the manager EPV. The ally component also registers the EPV manager with the DCE RPC runtime component 12-3. In accordance with the present invention, the ally manager EPV contains the following entries:

```
ally_V1_0_epv_t ally_v10 manager_epv =
client_establish_ally_assoc,
a_are_you_there,
a_load_info,
a_rpc_binding_from_string_bind,
a_rpc_binding_free,
a_rpc_binding_reset,
a_rpc_ns_binding_lookup_begin,
a_rpc_ns_binding_lookup_next,
a_rpc_ns_binding_lookup_done,
a_rpc_binding_set_auth_info,
a_rpc_binding_inq_auth_info,
a_sec_logic_setup_identity,
a_sec_logic_validate_identity,
a_rpc_if_set_wk_endpoint,.
```

After registering the interface and manager epv with its RPC runtime component 12-3, the ally component informs the RPC runtime to use all available protocol sequences via function rpc_server_use_all protseq. For each protocol combination, the RPC runtime component creates one or more binding handles. The ally component uses the binding handle information to register its transport protocol and well-known endpoint with the RPC daemon process, rpcd, using function rpc_ep_register(). This eliminates the need for the ally component to listen on a well-known transport endpoint.

It will be appreciated that the client system 10 only needs to know the network (transport) address of the ally system, not the actual endpoints. Thereafter, the ally is ready to listen for service requests from client system 10. When the ally component is ready to accept client requests, it initiates listening, specifying the maximum number of calls it can execute concurrently by calling the rpc_server_listen routine.

It is assumed by way of example that the client application desires to locate a compatible server to perform a particular name service operation (e.g. endpoint). To locate such a server, the client obtains binding information from the name service database by calling the lookup routines (rpc_ns_binding_lookup_begin, rpc_ns_binding_lookup_next and rpc_ns_binding_lookup_done) to obtain binding handles from which it can obtain a compatible server.

The client application issues the standard DCE call to the GX-RPC routine component. This invokes the code rpc_ns_binding_lookup_begin function which was discussed earlier in connection with FIG. 4a. This results in the determination by the RPC runtime component 10-2 that the function cannot be performed locally, but instead is to be performed by the ally component 12-10. The RPC lookup routine (nslookup.c) generates a call to the ally API component 10-12 (comally.c) via the function ally_ns_binding_lookup_begin.

As mentioned, the component 10-2 contains routines that provide the client side ally specific functionality. The component 10-2 routine ally_ns_binding_lookup_begin creates a naming service context on the ally system 12. The routine calls another function establish_ally_assoc (& st) which determines if the client has already established an association with ally component 12-10 (checks a context value). Assuming no association has been established (context=NULL), then the ally_ns_binding_lookup begin routine calls an internal routine/function establish_ally_assoc (& st). This routine uses the local ally address to establish a binding to the ally component 12-10 and thereafter it obtains the "real" binding of the ally component which is used in all future transactions.

The establish_ally_assoc (& st) routine performs a sequence of operations which enables the ally component 12-10 to make a decision as to how a binding handle should be returned to a client as a result of the protocols being supported by the client system and the ally for forwarding requests on compatible but not identical transport protocols. In the case where there is only one protocol being supported (e.g. UDP/IP), there is no need to check protocol compatibility. In such cases, this function is treated as a no op. In this sequence, it first constructs a list of the protocol sequences that the client system knows are available to communicate over to be transferred to ally component 12-10 which can be used when the ally component is providing a forwarding service function for client system 10.

Next, the routine allocates memory for storing protocol information obtained from the RPC runtime component 10-2 identifying the protocol sequences supported by the client system 10 available for use by a client application (i.e., uses RPC information RPC_PROTSEQ_INQ_PROTSEQ). This information is stored in the client's RPC memory area.

The establish_ally_assoc routine assumes none of the binding information it has stored is valid and begins by loading the ally address information stored in the client system file into a file called ally_bindings. In greater detail, the internal function rpc_set_next_ally_binding which is followed by a call to an external function rpc_get_wk_ally_bindings(). This function accesses the contents of the system configuration file containing the ally's address information (i.e., well-known ally string binding) and stores it in the file ally_binding. The function rpc_get_wk_ally_bindings() function using the local path name stored by the ally API component 10-12 accesses the client system configuration file and returns the string of characters in the ally_binding file and returns control back to the establish_ally_assoc runtime. The platform specific routine rpc_get_wk_ally_bindings does this by executing a sequence of standard functions using routines contained in library 10-6 (i.e., fopen, fget and fclose) which open the file, readout the contents into the ally_binding file and closes the system configuration file.

The establish_ally_assoc routine obtains the ally binding string and next converts it into an ally binding handle (uses function rpc_int_binding_from_string_binding). It then allocates a buffer area in its RPC memory to store any alternate ally binding information returned by ally component 12-10 (i.e., to establish compatible protocols).

The establish_ally_assoc routine next tries to call the ally. It makes an RPC call through the client stub using the parameters (ally_V1_0_C_epv.client_establish_ally_assoc). These parameters include the ally binding string parameters and a unique context parameter. The client stub generates the RPC call to the ally system 12 and carries out the necessary operations required for transmitting the call, according to the ally interface definitions discussed above (e.g. packaging the call parameters and transferring them to the GX-RPC component 10-2 for application to network 16 via the transport facilities).

The ally system 12 receives the client request via its RPC runtime component 12-3. As previously discussed, the ally request subcomponent 12-100 includes the table of entries which includes a client_establish_ally_assoc entry point. The receipt of this request invokes the ally client_establish_ally_assoc() routine. This routine enables the establishment of a new context with the ally. The ally component either accepts the client or redirects the request. Assuming acceptance, the ally returns a context handle to the client for future client use. Additionally, the ally component records in its database, the client's supported protocol sequences for later use by the ally's forwarding service subcomponent 12-104.

In greater detail, the routine issues the call rpc_binding_to_string_binding function to the ally system RPC component 12-3 which converts the client supplied ally binding information into a string binding containing the ally handle. In the same manner described above, the client_establish_ally_assoc routine passes the ally binding handle information to the RPC server stub which packages and transfers the response to the RPC call over network 16. The ally routine then invokes a database routine db-create_new_client_entry which adds the new client entry to its database. Also, the routine invokes a database routine db_add_client_protocol which adds the list of protocols supported by the new client to the Ally's database.

On the client system side, the client receives the Ally context handle and retrieves a base UUID.

In the above example, upon the completion of the routine establish_ally_assoc by the client system, now the client is initialized with the ally system and control is returned back to the ally API component routine ally_ns_binding_lookup_begin. Using the ally context, the client system 10 issues an RPC call to the ally (i.e., ally_V1_0_C_epv.a_rps_ns_binding_lookup_begin).

The above RPC call is transferred to the ally system in the same manner as described above. This time, the ally request subcomponent 12-10, upon receiving the call, invokes the ally Naming API routine a—rpc_ns_binding_lookup_begin defined by the entry point. This routine invokes a call to a corresponding one of the ally naming service routines (i.e., allyns.c file) ns_lookup_begin of naming subcomponent 12-102. This routine creates a lookup context for an interface (e.g., a print server interface) and optionally an object. It also verifies the client context from the Ally's client database.

The ally naming service subcomponent 12-102 routine ns_lookup_begin() obtains the lookup context handle, registers the lookup context handle in the client database and checks to see if the client has requested a security level for this interface specification (e.g., printer interface). Also, the routine registers the security level information with the context handle and returns the CDS lookup context handle to the client system 10.

More specifically, it first calls rpc_ns_binding_lookup_begin locally to get an NS context handle from the CDS component/server. Here, the ally RPC runtime component 12-3 satisfies the client lookup request through the name services (CDS) facilities which is accessible by the ally through its issuing of normal DCE calls.

Normally, the client system 10 uses the CDS lookup context it obtained from the ally system by calling the rpc_ns_binding_lookup_next routine. This routine is another of the RPC name service routines which, when accessed, results in a call to the comally.c subcomponent routine ally_ns_binding_lookup_next using the arguments obtained by the previous ally call (i.e., lookup_context, binding_vector).

Void a_rpc_ns_binding_lookup_next() return a list of compatible string bindings for a specified interface and, optionally, an object. This is not identical to generic rpc_ns_binding_lookup_next() since these binding handles are actually pointers to real storage managed by the RPC runtime. The client RPC runtime component, upon receipt of the string bindings, converts them back to binding handles which should be identical to what were generated by ally's RPC runtime component.

In order to maintain transparency of the ally component 12-10, this call returns a vector of binding handles just as normal case if there Is no security involved. Otherwise, the ally caches the vector of binding handles and returns a proxy binding handle to the client. When the forwarded RPC request fails to reach the target server, the ally component automatically gets the next one from the cached vector to try until it either succeeds or the list exhausts.

Without the involvement of the security, the proxy binding handle is not created until the list of binding handles was first exhausted (i.e., the ally component will try the forwarding service only after all compatible binding handles have been used). After the client application exhausts all the compatible binding handles, the ally component retrieves and caches all binding handles that it can communicate with the target server. The first one is then picked and marked as current and a proxy binding handle is created and returned to the client application.

When the client application finishes locating binding handles, it calls the rpc_ns_binding_lookup_done routine, a further RPC name service routine for detecting the lookup context. This routine when accessed, results in call to the ally API component routine ally_ns_binding_lookup_done routine.

From the above, it is seen how the present invention is able to provide the client system access to CDS naming service facilities via the ally system 12. This is done in such a manner as not to alter existing DCE RPC interfaces and enabling the use of standard DCE RPC calls. The sequence of operations for each of the above lookup operations is summarized in FIG. 4b.

Pertinent parts of the above discussed routines are included in Appendix III.

It will be appreciated that the other ally requests APIs are in a similar manner. For example, several of the security APIs summarized in Appendix I form part of standard security DCE APIs (e.g. sec_login_setup_identity() and sec_login_validate_identity()) are invoked by standard DCE RPC calls (i.e., sec_login_setup_identity() and sec_login_validate_identity() in the same manner as the naming APIs discussed above.

From the above, it is seen how the present invention is able to reduce significantly, the amount of components which have to be ported to a non-DCE system. Further, it reduces the non-DCE system based development, qualification and maintenance costs. Additionally, future RPC extensions (e.g. migration to new protocols and services) to the DCE based system where modification is more easily achieved.

It will be appreciated by those skilled in the art that many changes may be made without departing from the teachings of the present invention. For example, the invention may be used in conjunction with different system platforms and with other server applications included on the same system as the client or on different systems. Also, the teachings of the present invention may be used in conjunction with other DCE application programming interfaces.

APPENDIX I

SUMMARY OF ALLY APIs

I. Ally request APIs

A. client_establish_ally_assoc()

Use:
   This function is used to establish an RPC connection to the Ally component, and to establish an Ally context for this client. This is called as part of the normal RPC runtime initialization. In addition, this function also informs the Ally component about the communication interfaces supported by the local client system's operating system and RPC runtime. This information is used by the Ally component to filter binding handles before returning them to the client runtime. Since this function establishes the Ally connection, execution of this function does not depend upon any Ally services.

Client runtime actions:
   The client runtime uses this function to establish a client context on the Ally component. In the process, this routine will establish a binding handle to the Ally component from a well-known string binding representation of the Ally's address. This routine then calls the Ally component to obtain a context handle which is used to identify the client to the Ally component on future calls. Also, the communication protocol information is passed to the Ally component as an array of character strings, each string containing the NCS name for the transport provider. For example, since the client system supports UDP/IP, one of the strings passed is "ncadg_ip_udp."

Ally actions:
   Upon receiving the RPC from the client, the Ally component decides whether it is able to serve the request. If it is, the Ally component establishes a context for the new client, and returns a handle to this context back to the client. The Ally component also updates the client's protocol information in the client's context area. Future binding requests from the client may use this information to select the best binding handle to return to the client.

B. ally_are_you_there()

Use:
   This function allows the GCOS GX-RPC runtime component to check the livelihood of the Ally component and may have some other uses such as determining out how long it takes for a round trip between client runtime and the Ally component.

Client runtime actions:
   The client GX-RPC runtime calls this API to either get status back indicating the Ally component is alive or no response indicating the Ally component is dead.

Ally actions:
   The Ally component simply echoes the request indicating it is still alive.

C. ally_load_info()

Use:
   This function allows the GX-RPC runtime component to get the Ally's workload information.

Client runtime actions:
   The client runtime calls this API to get Ally's workload information.

Ally actions:
   The Ally component returns the workload information.

II. Binding APIs

A. rpc_binding_from_string_binding()/a_rpc_binding_from_string_binding

Use:
   This function is part of the standard DCE API and is used to create a binding handle from its string representation. This function requires Ally interaction to correctly support bindings that need to use the protocol forward subcomponent of the Ally component.

Client runtime actions:
   The client GX-RPC runtime component parses the string binding information passed in by the application into its appropriate parts. Next, the client GX-RPC runtime component determines whether the binding specifies a server which can be accessed directly by the client system. If so, the client GX-RPC runtime component creates the binding locally without any interaction with the Ally component. Otherwise, the client system passes the string binding information to the Ally component to allow the Ally component to provide a forwarding service. The Ally component either returns a new proxy binding handle to the Ally's forwarding service subcomponent or an error status stating that the Ally component is also unable to contact the server. The Ally system RPC runtime component then converts the proxy binding handle into an actual binding which may be returned to the client application.

Ally actions:

Upon receiving a request for a string binding from the client system, the Ally component determines whether it can use one of its supported protocols to reach the server. If not, an error is returned to the client GX-RPC runtime component. Otherwise, the Ally component allocates a transport endpoint (via the socket interface) on which the Ally component forwarding service subcomponent communicates with the client GX-RPC runtime component. The Ally component then converts this address into a string binding, which returned to the client as the proxy binding. Next, the proxy binding is associated with the actual binding within the client's context area. Now, the Ally component has enough information to forward packets from the proxy binding to the actual remote server. The Ally component registers this new transport endpoint with the Ally component listener thread to listen for traffic from the client system.

B. rpc_binding_free()/a_rpc_binding_free()

Use:

This function is a standard DCE function used to free a binding handle. If this binding handle is one being used by the Ally forwarding service subcomponent, this request must to sent to the Ally component to cause it to free any forwarding service resources.

Client runtime actions:

Upon receiving a call to rpc_binding_free(), the client GX-RPC runtime component converts the binding handle into its string representation and forwards it to the Ally component. This allows the Ally component to free any forwarding or security resources used by this binding handle. Upon return from the Ally component, the GX-RPC runtime component proceeds to free any resources held by this binding handle on the client system.

Ally actions:

The client RPC runtime component calls the Ally component with a binding handle to allow the Ally component to free any resources allocated to this binding handle. If the binding handle specified a proxy binding to the Ally's forwarding service subcomponent, the Ally component closes the transport endpoint specified by the proxy binding. In addition, for connection-oriented protocols, the Ally component closes any connection to the remote server system. The Ally component can then release any security and forwarding information associated with this proxy binding.

C. rpc_binding_reset()

Use:

This function is a standard DCE API used to remove any endpoint information from a binding handle. This function requires Ally interaction to remove the endpoint information from any bindings maintained by the Ally forwarding service subcomponent. In this case, the GX-RPC runtime component does not want to remove the local endpoint information, since this specifies the Ally's endpoint, not the actual server's endpoint.

Client runtime actions:

The client GX-RPC runtime component passes the specified binding handle to the Ally component to remove the endpoint information. The Ally component either removes the endpoint information for the binding handle if the binding was actually a proxy binding, or returns an error status to the runtime component. If the client runtime component receives the error status, it must remove the endpoint information locally, as in current RPC implementations.

Ally actions:

Upon receiving a request to remove endpoint information from a binding handle, the Ally component checks to see if the specified binding is actually one of the forwarding service subcomponent's proxy bindings. If not, the Ally component returns an error condition to the client GX-RPC runtime component, allowing the client system to unmap the endpoint locally. Otherwise, the Ally component removes any endpoint information from the real server binding associated with the proxy binding. For connection-oriented transports, the Ally component closes any connection to the remote server. Any future traffic on this binding handle to the server causes the Ally component to contact the rpcd program (which resides at a well known address on the server system) to get new endpoint information before forwarding the request.

III. Naming APIs (naming service)

A. rpc_ns_binding_lookup_begin()/a_rpc_ns_binding_lookup_begin()

Use:

This function is used by the GX-RPC runtime component to obtain a CDS context handle to perform binding lookups for an RPC interface specified by an interface-UUID and an options object-UUID. This context handle is then used to perform binding handle imports from the name space. This requires Ally interaction because the client system has no components which support any CDS services.

Client runtime actions:

The client RPC runtime component implements this routine as a client stub to the Ally component. No other client runtime component processing is required.

Ally actions:

The Ally component receives the request from the client GX-RPC runtime component and performs an actual call to its own RPC runtime component to allocate the CDS context handle. This handle is returned to the client system for use with future name service calls to import binding handles. In addition, the Ally component associates this CDS context handle with the interface-UUID and object-UUID until the client system performs a rpc_ns_binding_lookup_done() call. This information is needed by the Ally component to associate any security information with imported binding handles if the client system specified a security level using the rpc_if_register_auth_info ( ) call/function.

rpc_ns_binding_lookup_next()/a_rpc_ns_binding_lookup_next()

Use:

This function is used to import a vector of binding handles from the CDS name space. The client system passes a CDS context handle to this routine, which identifies an interface-UUID and object-UUID of the server.

Client runtime actions:

The client GX-RPC runtime component forwards this request to the Ally component through the use of the Ally's imported client stubs. The Ally component returns a vector of string bindings to the client system which may be used to access the server. The client GX-RPC runtime component converts these string bindings into binding handle vectors and returns them to the caller.

Ally actions:
The Ally component uses the context handle passed from the client system to perform an rpc_ns_binding_lookup_next() call/function to its local RPC runtime component. The RPC runtime component returns a vector of binding handles to the Ally component. If the context handle passed by the client system specified an interface with a security level set, the Ally component allocates an Ally proxy binding endpoint and registers it, along with the real binding vector, with the Ally security service subcomponent. This proxy handle is returned to the client system. If no security is required, the Ally component converts its binding vector into a set of string bindings. It then uses the client's protocol information to filter the list entries into the handles that are only accessible to the client system. If any handles remain, they are returned to the user. Otherwise, the Ally component creates a proxy binding handle to the Ally forwarding service subcomponent, and returns this to the client system. The Ally component transparently acts as forwarding service to the actual server.

C. rpc_ns_binding_lookup_done()/a_rpc_ns_binding_lookup_done()

Use:
This routine is used to free a CDS context handle and any resources held by this handle. This request is passed to the Ally component for execution and to allow the Ally component to free any resources.

Client runtime actions:
The client GX-RPC runtime component simply passes this call through to the Ally component for execution.

Ally actions:
The Ally component will call its RPC runtime component with the specified context handle to free up any CDS resources. It also frees up its own references to the context handle and any associated security information.

IV. Security APIs

A. rpc_binding_set_auth_info()/a_rpc_binding_set_auth_info()

Use:
This function is used to associate security information with a binding handle. The client application is required to have logged into the network using the sec_login_*calls/functions. This call requires interaction with the Ally component to inform the Ally's security service subcomponent of any changes to the binding handle's security level.

Client runtime actions:
The client runtime component passes the specified security information, including the binding handle itself to the Ally component. Upon return from the Ally component, the binding handle may have changed. In such a case, the client runtime component updates the binding handle with the new binding returned from the Ally component.

Ally actions:
This call is used by the client system to either set or remove security information from a binding handle.

First, in the case of setting information on a binding handle, the Ally component determines whether the binding handle is already a proxy binding handle. In this case, the Ally component simply associates the specified information with the binding handle. Otherwise, the Ally component returns allocate and returns a proxy binding handle. This routes all packets through the Ally component to have the security information added. The Ally component then registers the new binding with the forwarding subcomponent and associates the security information to it. The new proxy handle is then returned to the client system.

The case where a security level is being removed from a binding handle is handled as follows. First, the Ally component looks up the binding handle in its client specific context. It then removes all security information associated with the binding handle. Finally, if the binding handle was a proxy binding to the security service, and the client would otherwise be able to communicate with the server, the Ally component closes the proxy binding and return the real server binding back to the client system. Thereafter, all future transfers go directly to the server, without Ally intervention.

B. rpc_if_register_auth_info()/a_rpc_if_register_auth_info

Use:
This function is used to set the security level of a server interface. Any future binding handles allocated to this interface has the security level automatically set on them.

Client runtime actions:
The client GX-RPC runtime component simply forwards the appropriate information to the Ally component via a remote procedure call.

Ally actions:
Upon receiving the client's request, the Ally component registers the interface-UUID and object-UUID in the Ally's context area. The specified security information is associated with this interface information. When a name service binding import request is performed for this interface, the Ally component allocates a proxy binding handle for the client request and adds the specified level of security on behalf of the client system.

C. rpc_binding_inq_auth_info()/a_rpc_binding_inq_auth_info()

Use:
This function is used to retrieve the current security level associated with a binding handle. This function is part of the DCE API.

Client runtime actions:
The client GX-RPC runtime component passes this call/function to the Ally component because the Ally component is keeping track of all security information for the client. Since binding handles are not portable across systems, the client converts the binding into a string binding representation before calling the Ally component.

Ally actions:
The Ally component looks up the specified binding handle in the client's database entry and determines if any authentication information is set on this handle. If so, then the authentication parameters are returned to the client system.

D. sec_login_setup_identity()/a_sec_login-setup_identity()

Use:
This function is part of the standard DCE API. It is used by a client application to set up a DCE network identity. This network identity can then be used to register authentication levels on binding handles to perform security RPC calls.

Client runtime actions:
Since all security processing is done on the Ally, the client runtime component provides a simple "wrapper" which forwards this call to the Ally component. In a DCE system, this call returns a pointer to an opaque data structure in the RPC runtime component where all of the identity information is kept. In the non-DCE system (GX-RPC), this data actually is kept by the Ally component. Since RPC can not pass opaque pointers portably from system to system, the client system and Ally component exchange a UUID which uniquely identifies the identity information on the Ally system.

Ally actions:
Upon receiving this call from the client, the Ally component simply performs a call to sec_login_setup_identity() its RPC component to set up the identity locally. Upon successful completion of this call, the Ally component creates a new UUID. It then enters this UUID and the new authentication context handle (returned by the call to sec_login_set-up_identity()) into the client's database entry. This UUID is returned to the client GX-RPC runtime component. The client GX-RPC runtime component returns a pointer to this UUID as the "opaque handle" to the caller.

E. sec_login_validate_identity()/sec_login_validate_identity()

Use:
This function is part of the standard DCE API. It is used by a client program to validate a DCE network identity. This network identity can then be used to register authentication levels on binding handles to perform security RPC calls.

Client runtime actions:
Since all security processing is done on the Ally, the client runtime component provides a simple "wrapper" which forwards this call to the Ally component. The opaque auth_context handle is actually passed to the Ally component as a UUID which identifies the identity being validated.

Ally actions:
Upon receiving this call from the client system, the Ally component looks up the real auth_context handle from the client's database entry using the UUID. Once the Ally component has found the real auth_context handle, it calls the sec_login_validate_identity() call locally to validate the client's credentials on the Ally component.

F. rpc_if_set_wk_endpoint()/a_rpc_if_set_wk_endpoint()

Use:
This function is used internally by the client GX-RPC runtime component to notify the Ally component of any well-known endpoints specified in an RPC interface. The Ally component needs to known about these well-known endpoints to maintain the RPC semantics while performing forwarding operations.

Client runtime actions:
When the client runtime component performs a call on an RPC interface that has specified well-known endpoints, this call is made to notify the Ally component about the endpoints. The client system passes the interface-UUID, version number, and the endpoints to the Ally components and then continues with the call. For performance reasons, this call is only made on the first RPC call using this interface.

Ally actions:
Upon receiving this call from the client system, the Ally component enters the interface-UUID and endpoint information into its database. Whenever forwarding is done on a partially-bound binding handle, the Ally component first looks for any well-known endpoints associated with the interface. If it finds any, then the packet is forwarded to the well-known endpoint. Otherwise, the Ally component forwards the packet to the rpcd daemon on the remote system.

APPENDIX II

GLOSSARY 1. access control list (ACL)
   Security: Data that controls access to a protected object. An access control list specifies the privilege attribute(s) needed to access the object and the permissions that may be granted, with respect to the protected object, to principals that possess such privilege attribute(s).

2. attribute
   RPC: (1) IDL or ACF syntax element, occurring within square brackets, [], and conveying information about an interface, type, field, parameter, or operation. (2) An attribute of an entry in a name service database that stores binding, group, object, or profile information for an RPC application and identifies the entry as an RPC server entry; an NSI attribute.

3. authentication
   The verification of a principal's network identity.

4. authentication protocol
   A formal procedure for verifying a principal's network identify; Kerberos is an instance of a shared-secret authentication protocol.

5. Authentication Service
   One of three services provided by DCE Security: the Authentication Service authenticates principals according to a specified authentication protocol. The other Security services are the Privilege Service and the Registry Service.

6. binding
   RPC: A relationship between a client and a server involved in a remote procedure call.

7. binding handle
   RPC: A reference to binding information that defines one possible binding (a client/server relationship).

8. binding information
   RPC: Information about one or more potential bindings, including an RPC protocol sequence, a network address, an endpoint, at least one transfer syntax, and an RPC protocol version number.

9. call thread
   RPC: A thread created by a server's RPC runtime to execute remote procedures. When engaged by a remote procedure call, a call thread temporarily forms part of the RPC thread of the call.

10. cell
   1. The basic unit of operation in the DCE. A cell is a group of users, systems, and resources that are typically centered around a common purpose and that share common DCE services. At a minimum, a cell configuration includes one cell directory server, one security server, and one time server. A cell can consist of from one system to as many as several thousand systems. Systems in the cell can be in the same geographic area (for example, on the same LAN), but geography does not necessarily determine a cell's boundaries. The boundaries of a cell are typically influenced by its purpose, as well as by security, administrative, and performance considerations. With respect to individual DCE technologies, a cell represents:
   2. CDS: A unified naming environment consisting of CDS clerks and servers.

11. clearinghouse
   A collection of directory replicas on one CDS server. A clearinghouse takes the form of a database file. It can exist only on a CDS server node; it cannot exist on a node running only CDS clerk software. Usually only one clearinghouse exists on a server node, but there may be special cases when more than one exists.

12. clerk
   1. CDS: The software that provides an interface between client applications and CDS servers. The clerk receives a request from an application, sends the request to a CDS server, and returns any resulting information to the application. The clerk saves (caches) the results of lookups so that it does not have to repeatedly go to a CDS server for the same information.
   2. DTS: A software component that synchronizes the clock for its client system by requesting time values from servers, computing a new time from the values, and supplying the computed time to client applications.

13. client
   1. CDS: Any application that interacts with a CDS server through the CDS clerk.
   2. DTS: Any application that interacts with a DTS server through the DTS clerk.
   3. RPC: The party that initiates a remote procedure call. Some applications act as both an RPC client and an RPC server.

14. client binding information
   RPC: Information about a calling client provided by the client runtime to the server runtime, including the address where the call originated, the RPC protocol used for the call, the requested object UUID, and any client authentication information.

15. client context
   RPC: State in an RPC server's address space generated by a set of remote procedures (manager) and maintained across a series of calls for a particular client.

16. client stub
   RPC: The surrogate code for an RPC interface that is linked with and called by the client application code. In addition to general operations such as marshalling data, a client stub calls the RPC runtime to perform remote procedure calls and, optionally, manages bindings.

17. datagram
   An unreliable network data packet that is independent of all other packets and lacks any guarantees of delivery or sequentiality.

18. datagram protocol
   A connectionless, datagram-based transport protocol, such as UDP; and RPC protocol that runs over a connectionless transport protocol.

19. dynamic endpoint
   RPC: An endpoint that is generated by the RPC runtime for an RPC server when the server registers its protocol sequences and that expires when the server stops running. See also well-known endpoint, endpoint.

20. endpoint
   RPC: An address of a specific server instance on a host. See also dynamic endpoint, well-known endpoint.

21. endpoint map
   RPC: A system-wide database where local RPC servers register binding information associated with their interface identifiers and object UUIDs. The endpoint map is maintained by the endpoint map service of the RPC daemon.

22. endpoint map service
   RPC: A service provided by the RPC daemon that maintains a system's endpoint map for local RPC servers. When an RPC client makes a remote procedure call using a partially bound binding handle, the endpoint map service looks up the endpoint of a compatible local server.

23. entry point vector (EPV)
   RPC: A list of addresses for the entry points of a set of remote procedures that implements the operations declared in an interface definition. The addresses are listed in the same order as the corresponding operation declarations.

24. explicit binding method
   RPC: The explicit method of managing the binding for a remote procedure call in which a remote procedure call passes a binding handle as its first parameter. The binding handle is initialized in the application code.

25. export
   RPC: (1) To place the server binding information associated with an RPC interface or a list of object UUIDs or both into an entry in a name service database. (2) To provide access to an RPC interface.

26. fully bound binding handle
   RPC: A server binding handle that contains a complete server address including an endpoint.

27. function
   A programming language construct, modelled after the mathematical concept. A function encapsulates some behavior. It is given some arguments as input, performs some processing, and returns some results. Also known as procedures, subprograms or subroutines.

28. handle
   RPC: An opaque reference to information.

29. IDL compiler, DCE
   RPC: A compiler that processes an RPC interface definition and optional attribute configuration file (ACF) to generate client and server stubs, header files, and auxiliary files. See also Interface Definition Language, stub.

30. implicit binding method
    RPC: The implicit method of managing the binding for a remote procedure call in which a global variable in the client application holds a binding handle that the client stub passes to the RPC runtime.
31. import
    1. RPC: To obtain binding information from a name service database about a server that offers a given RPC interface by calling the RPC NSI import operation.
    2. RPC: To incorporate constant, type and import declarations from one RPC interface definition into another RPC interface definition by means of the IDL import statement.
32. interface definition
    RPC: A description of an RPC interface written in the DCE Interface Definition Language (IDL).
33. Interface Definition Language (IDL)
    RPC: A high-level declarative language that provides the syntax for interface definitions. The file syntax of the IDL interface definition is part of the Network Computing Architecture (NCA).
34. interface handle
    RPC: A reference in code to an interface specification.
35. interface identifier
    RPC: A string containing the interface universal unique identifier (UUID) and major and minor version numbers of a given RPC interface.
36. interface specification
    RPC: An opaque data structure, generated by the DCE IDL compiler from an interface definition, that contains identifying and descriptive information about an RPC interface.
37. interface UUID
    RPC: The universal unique identifier generated for an RPC interface definition using the UUID generator (uuidgen).
38. local server
    DTS: A server that synchronizes with its peers and provides it clock value to other servers and clerks on the same local area network (LAN).
39. login Facility
    A DCE Security facility that enables a principal to establish its identity and assume other identities.
40. manager
    RPC: A set of remote procedures that implement the operations of an RPC interface and that can be dedicated to a given type of object.
41. marshalling
    RPC: The process by which a stub converts local network data and packages the network data for transmission.
42. name service handle
    RPC: An opaque reference to the context used by the series of next operations called during a specific NSI search or inquiry.
43. name service interface (NSI)
    RPC: A part of the application programming interface of the RPC runtime. NSI routines access a name service, such as CDS, for the RPC applications.
44. namespace
    A complete set of CDS names (these can include directories, object entries, and soft links) that one or more CDS servers look up, manage, and share. CDS names are stored in directory replicas in clearinghouses at each server. The logical picture of a namespace is a hierarchical tree of all of those directories, with the root directory at the top, and one or more levels of directories beneath the root directory. The physical implementation of the namespace consists of directories replicated in one or more clearinghouses in the network.
45. network address
    RPC: An address that identifies a specific host on a network.
46. network data
    RPC: Data represented in a format defined by a transfer syntax.
47. Network Data Representation (NDR)
    RPC: The transfer syntax defined by the Network Computing Architecture.
48. network type
    RPC: A type defined in an interface definition and referenced in a [represent_as] clause that is converted into a local type for manipulation by application code.
49. NSI attribute
    RPC: An RPC-defined attribute of a name service entry used by the DCE RPC name service interface. An NSI attribute stores one of the following: binding information, object UUIDs, a group, or a profile.
50. NSI binding attribute
    RPC: An RPC-defined attribute (NSI attribute) of a name service entry; the binding attribute stores binding information for one or more interface identifiers offered by an RPC server and identifies the entry as an RPC server entry.
51. object
    1. A data structure that implements some feature and has an associated set of operations.
    2. RPC: For RPC applications, an object can be anything that an RPC server defines and identifies to its clients (using an object UUID). Often, an RPC object is a physical computing resource such as a database, directory, device or processor. Alternatively, an RPC object can be an abstraction that is meaningful to an application, such as a service or the location of a server.
    3. XDS: Anything in some "world," generally the world of telecommunications and information processing or some part thereof, that is identifiable (can be named) and for which the DIB contains some information.
    4. XOM: Any of the complex information objects created, examined, modified, or destroyed by means of the interface.
52. object name
    A CDS name for a network resource.
53. object UUID
    RPC: The universal unique identifier that identifies a particular RPC object. A server specifies a distinct object UUID for each of its RPC objects; to access a particular RPC object, a client uses the object UUID to find the server that offers the object.
54. potential binding
    RPC: A specific combination of an RPC protocol sequence, RPC protocol major version, network address, endpoint, and transfer syntax that an RPC client can use to establish a binding with an RPC server.

55. primitive binding handle
    RPC: A binding handle whose data type in IDL is handle_t and in application code is rpc_binding_handle_t.
56. register
    1. RPC: To list an RPC interface with the RPC runtime.
    2. RPC: To place server-addressing information into the local endpoint map.
    3. RPC: To insert authorization and authentication information into binding information.
57. Registry Service
    One of three services provided by DCE Security; the Registry Service manages account information for principals. The other services are the Privilege Service and the Authentication Service.
58. remote procedure
    RPC: An application procedure located in a separate address space from calling code.
59. remote procedure call (RPC)
    RPC: A procedure call executed by an application procedure located in a separate address space from the calling code.
60. RPC control program
    RPC: An interactive management facility for managing name service entries and endpoint maps for RPC applications. The program is started by the rpccp command.
61. RPC daemon (RPCD)
    RPC: The process that provides the endpoint map service for a system. The RPC daemon is started by the rpcd command.
62. RPC interface
    RPC: A logical grouping of operation, data type, and constant declarations that serves as a network contract for calling a set of remote procedures.
63. RPC protocol
    RPC: An RPC-specific communications protocol that supports the semantics of the DCE RPC API and runs over either connectionless or connection-oriented communications protocols.
64. RPC protocol sequence
    RPC: A valid combination of communications protocols represented by a character string. Each protocol sequence typically includes three protocols: a network protocol, a transport protocol, and an RPC protocol that works with those network and transport protocols.
65. RPC runtime
    RPC: A set of operations that manages communications, provides access to the name service database, and performs other tasks, such as managing servers and accessing security information, for RPC applications.
66. RPC runtime library
    RPC: Routines of the RPC runtime that support the RPC applications on a system. The runtime library provides a public interface to application programmers, the application programming interface (API), and a private interface to stubs, the stub programming interface (SPI).
67. server
    1. RPC: The party that receives remote procedure calls. A given application can act as both an RPC server and RPC client.
    2. CDS: A node running CDS server software. A CDS server handles namelookup requests and maintains the contents of the clearinghouse or clearinghouses at its node.
    3. DTS: A system or process that synchronizes with its peers and provides its clock value to clerks and their client applications.
68. server addressing information
    RPC: An RPC protocol sequence, network address, and endpoint that represent one way to access an RPC server over a network; a part of server binding information.
69. server binding information
    RPC: Binding information for a particular RPC server.
70. server entry
    1. RPC: A name service entry that stores the binding information associated with the RPC interfaces of a particular RPC server and, also, object UUIDs for any objects offered by the server.
71. server instance
    RPC: A server executing in a specific address space; multiple server instances can coexist on a single system.
72. server stub
    RPC: The surrogate calling code for an RPC interface that is linked with server application code containing one or more sets of remote procedures (managers) that implement the interface.
73. stub
    RPC: A code module specific to an RPC interface that is generated by the DCE IDL compiler to support remote procedure calls for the interface. RPC stubs are linked with client and server application and hide the intricacies of remote procedure calls from the application code.
74. thread
    A single sequential flow of control within a process.
75. transport layer
    A network service that provides end-to-end communications between two parties, while hiding the details of the communications network. The TCP and ISO TP4 transport protocols provide full-duplex virtual circuits on which delivery is reliable, error free, sequenced, and duplicate free. UDP provides no guarantees (the connectionless RPC protocol provides some guarantees on top of UDP).
76. transport protocol
    A communications protocol from the Transport Layer of the OSI network architecture, such as the Transmission Control Protocol (TCP) or the User Datagram Protocol (UDP).
77. universal unique identifier (UUID)
    RPC: An identifier that is immutable and unique across time and space. A UUID can uniquely identify an entity such as an RPC interface or object.
78. unmarshalling
    RPC: The process by which a stub disassembles incoming network data and converts it into local data in the appropriate local data representation.
79. vector
    RPC: An array of other structures and the number of array items.
80. well-known endpoint
    RPC: A preassigned, stable endpoint that a server can use every time it runs. Well-known endpoints typically are assigned by a central authority responsible for a transport protocol. An application declares a well-known endpoint either as an attribute in an RPC interface header or as a variable in the server application code.

APPENDIX III

ALLY.H

NAME ally.h

```
/* Generated by IDL compiler version DCE 1.0.0-1 */
#ifndef ally_v1_0_included
#define ally_v1_0_included
#include <dce/idlbase.h>
include <dce/rpc.h> ifdef __cplusplus
    extern "C" {
endif include <dce/nbase.h>
include <dce/rpctypes.h>
#include <allysts.h>
#include <dce/passwd.h>
#include <dce/secsts.h>
#include <dce/id_base.h>
#include <dce/rgynbase.h>
#include <sec_login.h>
#define ALLY_MAX_PROTOCOL_LEN 32
#define ALLY_MAX_PRINCIPAL_LEN 64
#define ALLY_MAX_STRING_BINDING_LEN 64
#define ALLY_MAX_BINDING_VECTOR_LEN 16
#define ALLY_MAX_SYNTAX_IDS 8
#define CLIENT_MAX_PTR 5
#define GRPC_SEC 1
#define MAX_PACKET_SIZE 2048
#define ally_s_ok error_status_ok
#define ally_c_protocol_id_ncacn 0
#define ally_c_protocol_id_ncadg 1
#define ally_c_protocol_id_ncatp 2
#define ally_c_invalid_protocol_id -1
#define ally_binding_entry "/.:/ally/bindings"
typedef idl_char unchar_t;
typedef unchar_t *unchar_p_t;
typedef idl_char string_t[1];
typedef idl_char principal_name_t[64];
typedef principal_name_t (*principal_name_p_t);
typedef idl_char protocol_name_t[32];
typedef protocol_name_t (*protocol_name_p_t);
typedef struct ally_v1_0_0_tag {
protocol_name_p_t name;
idl_long_int protocol_id;
} protocols_struct;
typedef idl_char string_binding_t[1];
typedef string_binding_t (*string_binding_p_t);
```

-83-
```
typedef string_binding_p_t binding_vector_t[16];
typedef struct {
uuid_t id;
unsigned32 version;
} ally_syntax_id_t;
typedef struct {
idl_ulong_int count;
ally_syntax_id_t syntax_id[8];
} ally_syntax_vector_t;
typedef struct {
idl_ushort_int ifspec_vers;
idl_ushort_int opcnt;
idl_ulong_int vers;
uuid_t id;
idl_ushort_int stub_rtl_if_vers;
ally_syntax_vector_t syntax_vector;
} ally_if_rep_t;
typedef ally_if_rep_t *ally_ifspec_p_t;
typedef struct ally_v1_0_1_tag {
protocol_name_p_t rpc_protseq;
string_binding_p_t endpoint;
} endpoint_t;
typedef endpoint_t *endpoint_p_t;
typedef unsigned32 load_info_t;
typedef idl_void_p_t client_ch_t;
typedef idl_void_p_t ns_handle_t;
typedef unsigned32 a_sec_login_flags_t;
typedef unsigned32 sec_login_string_t;
typedef enum {a_sec_login_auth_src_network,
a_sec_login_auth_src_local} a_sec_login_auth_src_t;
typedef sec_rgy_unix_passwd_t a_sec_login_passwd_t;
typedef struct {
sec_id_pac_t pac;
unsigned32 acct_expiration_date;
unsigned32 passwd_expiration_date;
unsigned32 identity_expiration_date;
} a_sec_login_net_info_t;
extern void client_establish_ally_assoc(
#ifdef IDL_PROTOTYPES
    /* [in] */ handle_t ally_handle,
    /* [out] */ client_ch_t *client_handle,
    /* [in, out] */ string_t (*ally_binding),
    /* [in] */ idl_long_int redirected,
    /* [in] */ idl_long_int num_protocols,
    /* [in] */ protocols_struct protocols[],
    /* [out] */ error_status_t *status
#endif
);
extern void a_are_you_there(
#ifdef IDL_PROTOTYPES
    /* [in] */ client_ch_t client_handle,
    /* [out] */ error_status_t *status
#endif
```

```
);
extern void a_load_info(
#ifdef IDL_PROTOTYPES
    /* [in] */ handle_t ally_handle,
    /* [out] */ load_info_t *my_load_status,
    /* [out] */ error_status_t *status
#endif
);
extern void a_rpc_binding_from_string_bind(
#ifdef IDL_PROTOTYPES
    /* [in] */ client_ch_t client_handle,
    /* [in, out] */ string_t (*string_binding),
    /* [out] */ error_status_t *status
#endif
);
extern void a_rpc_binding_free(
#ifdef IDL_PROTOTYPES
    /* [in] */ client_ch_t client_handle,
    /* [in] */ string_t (*binding_handle),
    /* [out] */ error_status_t *status
#endif
);
extern void a_rpc_binding_reset(
#ifdef IDL_PROTOTYPES
    /* [in] */ client_ch_t client_handle,
    /* [in] */ string_t (*binding_handle),
    /* [out] */ error_status_t *status
#endif
);
extern void a_rpc_ns_binding_lookup_begin(
#ifdef IDL_PROTOTYPES
    /* [in] */ client_ch_t client_handle,
    /* [in] */ unsigned32 entry_name_syntax,
    /* [in] */ string_t (*entry_name),
    /* [in] */ ally_ifspec_p_t if_spec,
    /* [in] */ uuid_p_t object_uuid,
    /* [in] */ unsigned32 binding_max_count,
    /* [out] */ ns_handle_t *lookup_context,
    /* [out] */ error_status_t *status
#endif
);
extern void a_rpc_ns_binding_lookup_next(
#ifdef IDL_PROTOTYPES
    /* [in] */ ns_handle_t lookup_context,
    /* [out] */ idl_long_int *num_bindings,
    /* [out] */ binding_vector_t binding_vector,
    /* [out] */ error_status_t *status
#endif
);
extern void a_rpc_ns_binding_lookup_done(
#ifdef IDL_PROTOTYPES
    /* [in, out] */ ns_handle_t *lookup_context,
    /* [out] */ error_status_t *status
```

```
#endif
);
extern void a_rpc_binding_set_auth_info(
#ifdef IDL_PROTOTYPES
    /* [in] */ client_ch_t client_handle,
    /* [in, out] */ string_t (*binding_handle),
    /* [in] */ principal_name_p_t server_princ_name,
    /* [in] */ unsigned32 authn_level,
    /* [in] */ unsigned32 authz_level,
    /* [in] */ sec_login_string_t auth_identity,
    /* [in] */ unsigned32 authz_svc,
    /* [out] */ error_status_t *status
#endif
);
extern void a_rpc_binding_inq_auth_info(
#ifdef IDL_PROTOTYPES
    /* [in] */ client_ch_t client_handle,
    /* [in] */ string_t (*binding_handle),
    /* [out] */ principal_name_p_t *server_princ_name,
    /* [out] */ unsigned32 *authn_level,
    /* [out] */ unsigned32 *authz_level,
    /* [out] */ sec_login_string_t *auth_identity,
    /* [out] */ unsigned32 *authz_svc,
    /* [out] */ error_status_t *status
#endif
);
extern void a_rpc_if_register_auth_info(
#ifdef IDL_PROTOTYPES
    /* [in] */ client_ch_t client_handle,
    /* [in] */ ally_ifspec_p_t if_spec,
    /* [in] */ principal_name_p_t server_princ_name,
    /* [in] */ unsigned32 authn_level,
    /* [in] */ unsigned32 authz_level,
    /* [in] */ sec_login_string_t auth_identity,
    /* [in] */ unsigned32 authz_svc,
    /* [out] */ error_status_t *status
#endif
);
extern boolean32 a_sec_login_setup_identity(
#ifdef IDL_PROTOTYPES
    /* [in] */ client_ch_t client_handle
    /* [in] */ principal_name_p_t name,
    /* [in] */ unsigned32 flags,
    /* [out] */ sec_login_string_t *login_context,
    /* [out] */ error_status_t *status
#endif
);
extern boolean32 a_sec_login_validate_identity(
#ifdef IDL_PROTOTYPES
    /* [in] */ client_ch_t client_handle,
    /* [in] */ sec_login_string_t login_context,
    /* [in] */ sec_passwd_rec_t *passwd,
    /* [out] */ idl_boolean *reset_passwd,
```

```
                             -86-
    /* [out] */ unsigned32 *auth_src,
    /* [out] */error_status_t *status
#endif
);
extern void a_rpc_if_set_wk_endpoint(
#ifdef IDL_PROTOTYPES
    /* [in] */ client_ch_t client_handle,
    /* [in] */ ally_ifspec_p_t if_spec,
    /* [in] */ idl_long_int num_endpoints,
    /* [in] */ endpoint_t endpoints[],
    /* [out] */ error_status_t *status
#endif
);
extern void client_remove_ally_assoc(
#ifdef IDL_PROTOTYPES
    /* [in] */ client_ch_t client_handle
#endif
);
void client_ch_t_rundown(
#ifdef IDL_PROTOTYPES
    rpc_ss_context_t context_handle
#endif
);
void ns_handle_t_rundown(
#ifdef IDL_PROTOTYPES
    rpc_ss_context_t context_handle
#endif
);
typedef struct ally_v1_0_epv_t {
void (*client_establish_ally_assoc)(
#ifdef IDL_PROTOTYPES
    /* [in] */ handle_t ally_handle,
    /* [out] */ client_ch_t *client_handle,
    /* [in, out] */ string_t (*ally_binding),
    /* [in] */ idl_long_int redirected,
    /* [in] */ idl_long_int num_protocols,
    /* [in] */ protocols_struct protocols[],
    /* [out] */ error_status_t *status
#endif
);
void (*a_are_you_there)(
#ifdef IDL_PROTOTYPES
    /* [in] */ client_ch_t client_handle,
    /* [out] */ error_status_t*status
#endif
);
void (*a_load_info)(
#ifdef IDL_PROTOTYPES
    /* [in] */ handle_t ally_handle
    /* [out] */ load_info_t *my_load_status,
    /* [out] */ error_status_t *status
#endif
);
```

```
void (*a_rpc_binding_from_string_bind)(
#ifdef IDL_PROTOTYPES
    /* [in] */ client_ch_t client_handle,
    /* [in, out] */ string_t (*string_binding),
    /* [out] */ error_status_t *status
#endif
);
void (*a_rpc_binding_free)(
#ifdef IDL_PROTOTYPES
    /* [in] */ client_ch_t client_handle,
    /* [in] */ string_t (*binding_handle),
    /* [out] */ error_status_t *status
#endif
);
void (*a_rpc_binding_reset)(
#ifdef IDL_PROTOTYPES
    /* [in] */ client_ch_t client_handle,
    /* [in] */ string_t (*binding_handle),
    /* [out] */ error_status_t *status
#endif
);
void (*a_rpc_ns_binding_lookup_begin)(
#ifdef IDL_PROTOTYPES
    /* [in] */ client_ch_t client_handle,
    /* [in] */ unsigned32 entry_name_syntax,
    /* [in] */ string_t (*entry_name),
    /* [in] */ ally_ifspec_p_t if_spec,
    /* [in] */ uuid_p_t object_uuid,
    /* [in] */ unsigned32 binding_max_count,
    /* [out] */ ns_handle_t *lookup_context,
    /* [out] */ error_status_t *status
#endif
);
void (*a_rpc_ns_binding_lookup_next)(
#ifdef IDL_PROTOTYPES
    /* [in] */ ns_handle_t lookup_context,
    /* [out] */ idl_long_int *num_bindings,
    /* [out] */ binding_vector_t binding_vector,
    /* [out] */ error_status_t *status
#endif
);
void (*a_rpc_ns_binding_lookup_done)(
#ifdef IDL_PROTOTYPES
    /* [in, out] */ ns_handle_t *lookup_context,
    /* [out] */ error_status_t *status
#endif
);
void (*a_rpc_binding_set_auth_info)(
#ifdef IDL_PROTOTYPES
    /* [in] */ client_ch_t client_handle,
    /* [in, out] */ string_t (*binding_handle),
    /* [in] */ principal_name_p_t server_princ_name,
    /* [in] */ unsigned32 authn_level,
```

```
    /* [in]  */ unsigned32 authz_level,
    /* [in]  */ sec_login_string_t auth_identity,
    /* [in]  */ unsigned32 authz_svc,
    /* [out] */ error)status_t *status
#endif
);
void (*a_rpc_binding_ing_auth_info)(
#ifdef IDL_PROTOTYPES
    /* [in]  */ client_ch_t client_handle,
    /* [in]  */ string_t (*binding_handle),
    /* [out] */ principal_name_p_t *server_princ_name,
    /* [out] */ unsigned32 *authn_level,
    /* [out] */ unsigned32 *authz_level,
    /* [out] */ sec_login_string_t *auth_identity,
    /* [out] */ unsigned32 *authz_svc,
    /* [out] */ error_status_t *status
#endif
);
void (*a_rpc_if_register_auth_info)(
#ifdef IDL_PROTOTYPES
    /* [in]  */ client_ch_t client_handle,
    /* [in]  */ ally_ifspec_p_t if_spec,
    /* [in]  */ principal_name_p_t server_princ_name,
    /* [in]  */ unsigned32 authn_level,
    /* [in]  */ unsigned32 authz_level,
    /* [in]  */ sec_login_string_t auth_identity,
    /* [in]  */ unsigned32 authz_svc,
    /* [out] */ error_status_t *status
#endif
);
boolean32 (*a_sec_login_setup_identity)(
#ifdef IDL_PROTOTYPES
    /* [in]  */ client_ch_t client_handle,
    /* [in]  */ principal_name_p_t name,
    /* [in]  */ unsigned32 flags,
    /* [out] */ sec_login_string_t *login_context,
    /* [out] */ error_status_t *status
#endif
);
boolean32 (*a_sec_login_validate_identity)(
#ifdef IDL_PROTOTYPES
    /* [in]  */ client_ch_t client_handle,
    /* [in]  */ sec_login_string_t login_context,
    /* [in]  */ sec_passwd_rec_t *passwd,
    /* [out] */ idl_boolean *reset_passwd,
    /* [out] */ unsigned32 *auth_src,
    /* [out] */ error_status_t *status
#endif
);
void (*a_rpc_if_set_wk_endpoint)(
#ifdef IDL_PROTOTYPES
    /* [in]  */ client_ch_t client_handle,
    /* [in]  */ ally_ifspec_p_t if_spec,
```

```
                        -89-
    /* [in] */ idl_long_int num_endpoints,
    /* [in] */ endpoint_t endpoints[],
    /* [out] */ error_status_t *status
#endif
);
void (*client_remove_ally_assoc)(
#ifdef IDL_PROTOTYPES
    /* [in] */ client_ch_t client_handle
#endif
);
} ally_v1_0_epv_t;
extern ally_v1_0_epv_t ally_v1_0_c_epv;
extern rpc_if_handle_t ally_v1_0_c_ifspec;
extern rpc_if_handle_t ally_v1_0_s_ifspec;

#ifdef __cplusplus
    }
endif endif
```

APPENDIX III

ALLYINT.IDL

```
/*
 * allyint.idl -
 *
 *   This file contains the interface definitions for the Ally's internal
 *   components.  This is used to generate a header file that contains
 *   prototypes. No stubs are generated.
 */

[
    version(1.0),
    local
]
interface allyint
{
    import "dce/lbase.idl";
    import "ally.idl";

/*
     * Ally-wide tweakable constants.
     */ const short    ALLY_PROXY_THREADS = 10;

/*
     * Type definitions.
     */ typedef void    *rpc_binding_handle_p_t;

typedef [ptr]char    *string_p_t;

typedef enum
    {
        ally_malloc_string,
        ally_malloc_dbentry,
        ally_malloc_protinfo,
        ally_malloc_ally_ifspec,
        ally_malloc_rpc_ifspec,
        ally_malloc_ifblk,
        ally_malloc_addr,
        ally_malloc_addrblk,
        ally_malloc_actuuid,
        ally_malloc_fwdblk,
        ally_malloc_secinfo,
        ally_malloc_protvec,
        ally_malloc_ident,
```

-91-
```c
    ally_malloc_perthread,
    ally_malloc_sockblk,
    ally_malloc_nsctx,
    ally_malloc_nsnode,
    ally_malloc_objuuid,
    ally_malloc_syntaxarray,
    ally_malloc_ep,
    ally_malloc_ifreq,
    ally_malloc_baddr,
    ally_malloc_baddrvec,
    ally_malloc_wkports,
    ally_malloc_last
} malloc_type;

/*
 * Ally initialization functions.
 */

/*
 * Initialization for the database subsystem.
 */
void ally_db_init();

/*
 * Initialization for the Ally naming service subsystem.
 */
void ally_ns_init();

/*
 * Initialization for the listener.
 */
void ally_listener_init();

/*
 * Initialize the ally malloc()/free() routines.
 */
void ally_malloc_init();

/*
 * Ally database manipulation functions.
 */
/*
 * Add a new client to the Ally database.
 */
void *db_create_new_client_entry
(
    [out] error_status_t *status
);

/*
 * Remove a client entry from the Ally database.
 */
```

-92-
```
void db_destroy_client_entry
(
    [in]    void        *context_handle
);

/*
 * Add a protocol sequence to a client's entry.
 */
void db_add_client_protocol
(
    [in]    void            *context_handle,
    [in]    char            *protocol_name,
    [in]    long int        protocol_type,
    [out]   error_status_t  *status
);

/*
 * Register an Ally protocol with the database.
 */
void db_register_ally_protocol
(
    [in]    char            *protocol_name,
    [out]   error_status_t  *status
);

/*
 * Look up the protocol type based on a protocol
sequence name.
 */
void db_inq_ally_protocol_type_from_name
(
    [in]    char            *protocol_name,
    [out]   long int        *protocol_type
);

/*
 * Find all client protocol names for a given protocol
type (i.e. DG)
 */
    void db_inq_client_protocol_names_from_type
(
    [in]    client_ch_t         client_handle,
    [in]    unsigned32          protocol_type,
    [out]   string_p_t          **protocols,
    [out]   error_status_t      *status
);

/*
 * Does the client support the specified protocol?
 */
boolean db_is_client_protocol
(
    [in]    client_ch_t             client_handle,
```

-93-
```
        [in]    unsigned_char_p_t   protocol_name
    );

/*
     * Ally naming service interfaces.
     */
    /*
     * ns_lookup_begin - create a NS context and return it
to the client.
     */
    void ns_lookup_begin
    (
        [in]    client_ch_t     client_handle,
        [in]    unsigned32      entry_name_syntax,
        [in]    string_t  *entry_name,
        [in]    ally_ifspec_p_t     if_spec,
        [in]    uuid_p_t  object_uuid,
        [in]    unsigned32      binding_max_count,
        [out]   ns_handle_t     *lookup_context,
        [out]   error_status_t *status
    );

}
```

-94-
APPENDIX III

ALLY.IDL

```
/*
 * ally.idl -
 */

[
    uuid(9dba0b40-76c9-11ca-9452-c05c6e01abcd),
    version(1.0),pointer_default (ref)
]

interface ally

{

/*
     * Import files.
     */ import "dce/rpctypes.idl";

/*
     * Local constants
     */ const short     ALLY_MAX_PROTOCOL_LEN = 32;
    const short     ALLY_MAX_PRINCIPAL_LEN = 64;
    const short     ALLY_MAX_STRING_BINDING_LEN = 64;
    const short     ALLY_MAX_BINDING_VECTOR_LEN = 16;
    const short     ALLY_MAX_SYNTAX_IDS = 8;

const long      MAX_PACKET_SIZE = 2048;

/*
     * Ally status codes. Most of these are in the ally.msg
file, but a
     * few need to be defined here.
     */
    const long      ally_s_ok = error_status_ok;

/*
     * Ally protocol id's
     */
    const short     ally_c_protocol_id_ncacn = 0;
    const short     ally_c_protocol_id_ncadg = 1;
    const short     ally_c_protocol_id_ncatp = 2;
    const short     ally_c_invalid_protocol_id    = -1;

/*
```

```
                                       -95-
    * Ally namespace binding entry.
    */
   const char *ally_binding_entry = "/.:/ally/bindings";

/*
    * Local type definitions
    */ typedef unsigned char      unchar_t;
   typedef [ptr]unchar_t      *unchar_p_t;
   typedef [string] char      string_t[];

/*
    * Type definitions for transmitting principal names.
    */
   typedef    [string]char
    principal_name_t[ALLY_MAX_PRINCIPAL_LEN];
   typedef [ptr]principal_name_t *principal_name_p_t;

/*
    * Type definitions used to pass protocol information
from the client to
    * the Ally.
    */
   typedef    [string]char
    protocol_name_t[ALLY_MAX_PROTOCOL_LEN];
   typedef [ptr]protocol_name_t *protocol_name_p_t;
   typedef struct
   {
    protocol_name_p_t   name;
    long int            protocol_id;
   } protocols_struct;

/*
    * RPC binding vector type definitions.
    typedef [string]char
     string_binding_t[ALLY_MAX_STRING_BINDING_LEN];
    */
   typedef [string]char string_binding_t[];
   typedef [ptr]string_binding_t  *string_binding_p_t;
   typedef string_binding_p_t
binding_vector_t[ALLY_MAX_BINDING_VECTOR_LEN];

/*
    * RPC interface specification.  This is an IDL
representation of the
    * if_spec structure used within the stubs.  We need to
pass this info
    * over the net in order to import bindings from the
namespace.
    */
   /*
```

```
 * A transfer syntax representation. The transfer syntax values are
 * architected.
 *
 * obtained from rpcbase.idl.
 */
typedef struct
{
    uuid_t                  id;
    unsigned32              version;
} ally_syntax_id_t;

typedef struct
{
    unsigned long           count;
    [length_is(count)]
    ally_syntax_id_t
syntax_id[ALLY_MAX_SYNTAX_IDS];
} ally_syntax_vector_t;

/*
 * The contents of the ally_if_rep_t structure is similar to the
 * rpc_if_rep_t structure defined in stubbase.h with a few changes.
 * For example, the nase service doesn't needs access to the endpoints
 * or the epv's, so we don't send them over the wire.
 */
typedef struct
{
    unsigned short          ifspec_vers;
    unsigned short          opcnt;
    unsigned long           vers;
    uuid_t                  id;
    unsigned short          stub_rtl_if_vers;
    ally_syntax_vector_t     syntax_vector;
} ally_if_rep_t;

typedef [ptr]ally_if_rep_t *ally_ifspec_p_t;

/*
 * Data structures for transmitting endpoint information.
 */
typedef struct
{
    protocol_name_p_t       rpc_protseq;
    string_binding_p_t      endpoint;
} endpoint_t;
```

```
                              -97-
    typedef [ptr]endpoint_t *endpoint_p_t;

/*
     * Other misc. types.
     */ typedef    unsigned32 load_info_t;
    typedef    [context_handle] void    *client_ch_t;
    typedef    [context_handle] void    *ns_handle_t;

/*
     * Interface operations.
     */ void client_establish_ally_assoc
(
    [in] handle_t   ally_handle,
    [out]      client_ch_t    *client_handle,
    [in,out,ptr]    string_t   *ally_binding,
    [in] long int   redirected,
    [in] long int   num_protocols,
    [in,size_is(num_protocols)]
         protocols_struct      protocols[],
    [out]      error_status_t *status
);

void a_rpc_ns_binding_lookup_begin
(
    [in] client_ch_t    client_handle,
    [in] unsigned32     entry_name_syntax,
    [in,ptr]string_t    *entry_name,
    [in] ally_ifspec_p_t    if_spec,
    [in] uuid_p_t   object_uuid,
    [in] unsigned32     binding_max_count,
    [out]      ns_handle_t    *lookup_context,
    [out]      error_status_t *status
);
}
```

-98-
APPENDIX III

NSLOOKUP.C

```
/*
**  Copyright (c) 1989 by
**      Hewlett-Packard Company, Palo Alto, Ca. &
**      Digital Equipment Corporation, Maynard, Mass.
**
**  @OSF_COPYRIGHT@
**
**  NAME
**
**      nslookup.c
**
**  FACILITY:
**
**      Remote Procedure Call (RPC)
**
**  ABSTRACT:
**
**  RPC Name Service routines to create and manage contexts for binding
**  lookups.
**
**
*/
```

．
．
．

```
/*
**++
**
**      ROUTINE NAME:           rpc_ns_binding_lookup_begin
**
**      SCOPE:                  PUBLIC - declared in rpc.idl
**
**      DESCRIPTION:
**
**      Creates a lookup context to be used in a search of the namespace
**      for a binding to a specified interface (and optionally, an object).
**
**      INPUTS:
**
**              entry_name_syntax   An integer value that specifies the syntax of
**                                  the next argument, entry_name. To use the syntax
**                                  specified in the RPC_DEFAULT_ENTRY_SYNTAX
**                                  environment variable, provide a value of NULL.
**
**              entry_name          The entry in the namespace in which the search for
**                                  compatible bindings is to commence. To use the entry
**                                  name found in the RPC_DEFAULT_ENTRY environment
**                                  variable, provide a NULL pointer or an empty string.
**
**              if_spec             A pointer to an interface specification describing
**                                  the desired interface.
**                                  A NULL if_spec means the caller does not want
**                                  the returned bindings checked for compatibility with
**                                  an exported interface.
**                                  When NULL, the if_spec initialization in the lookup
**                                  context is bypassed.
**
**              object_uuid         An optional object uuid which would be used to
**                                  further qualify the interface. For a non-nil uuid,
**                                  only compatible bindings are returned from a server
```

```
/*
**++
**
**   ROUTINE NAME:         rpc_ns_binding_lookup_begin
**
**   SCOPE:                PUBLIC - declared in rpc.idl
**
**   DESCRIPTION:
**
**   Creates a lookup context on the Ally to be used in a search of the namespace
**   for a binding to a specified interface (and optionally, an object).
**
**   INPUTS:
**
**       entry_name_syntax   An integer value that specifies the syntax of
**                           the next argument, entry_name. To use the syntax
**                           specified in the RPC_DEFAULT_ENTRY_SYNTAX
**                           environment variable, provide a value of NULL.
**
**       entry_name          The entry in the namespace in which the search for
**                           compatible bindings is to commence. To use the entry
**                           name found in the RPC_DEFAULT_ENTRY environment
**                           variable, provide a NULL pointer or an empty string.
**
**       if_spec             A pointer to an interface specification describing
**                           the desired interface.
**                           A NULL if_spec means the caller does not want
**                           the returned bindings checked for compatibility with
**                           an exported interface.
**                           When NULL, the if_spec initialization in the lookup
**                           context is bypassed.
**
**       object_uuid         An optional object uuid which would be used to
**                           further qualify the interface. For a non-nil uuid,
**                           only compatible bindings are returned from a server
```

```
-101-
**                              entry if the server has exported the
specified object
**                              uuid. If the object uuid's are not
of concern to the
**                              caller, specify a NULL pointer value
or a nil uuid.
**                              In this case the compatible bindings
returned from
**                              a server entry contain a nil object
uuid.
**
**      binding_max_cnt         A user-specified limit on the size
of the binding
**                              vector to be allocated for returning
bindings.  The
**                              size of the vector is specified in
units of "bindings".
**                              What this translates into in terms
of actual memory
**                              is not (can not and should not) be
known to the user.
**
**  INPUTS/OUTPUTS:     none
**
**  OUTPUTS:
**
**      lookup_context          A pointer to a lookup context to be
used in the search.
**
**      status                  The result of the operation. One of:
**                                  rpc_s_ok
**                                  rpc_s_no_memory
**                                  rpc_s_invalid_object
**
**  IMPLICIT INPUTS:    none
**
**  IMPLICIT OUTPUTS:   none
**
**  FUNCTION VALUE:     void
**
**  SIDE EFFECTS:       none
**
**--
**/

PUBLIC void rpc_ns_binding_lookup_begin (entry_name_syntax, entry_name,
      if_spec, object_uuid, binding_max_cnt, lookup_context, status)

unsigned32              entry_name_syntax;
unsigned_char_p_t       entry_name;
rpc_if_handle_t         if_spec;
```

-102-
```
    uuid_p_t                    object_uuid;
    unsigned32                  binding_max_cnt;
    rpc_ns_handle_t             *lookup_context;
    unsigned32                  *status;

{
    unsigned32              temp_entry_name_syntax;
    unsigned_char_p_t       temp_entry_name;

CODING_ERROR (status);
    RPC__NS_VERIFY_INIT ();

/*
     * We have to resolve the DEFAULT_ENTRY_NAME and the
     * DEFAULT_ENTRY_NAME_SYNTAX variables locally. Otherwise, we will end up
     * using the Ally's version of these variables, which is not at all what
     * we want.
     */
    temp_entry_name_syntax = entry_name_syntax;
    temp_entry_name = entry_name;

RPC_RESOLVE_NAME_AND_SYNTAX(temp_entry_name,temp_entry_name_syntax,status);
    if (*status != rpc_s_ok)
        return;

/*
     * Hand this request off to the Ally and let it deal with it.
     */
    ally_ns_binding_lookup_begin (temp_entry_name_syntax, temp_entry_name,
            if_spec, object_uuid, binding_max_cnt, lookup_context, status);

}
```

APPENDIX III

COMALLY.C

```
/*
**
**   NAME
**
**        comally.c
**
**   FACILITY:
**
**        Remote Procedure Call (RPC)
**
**   ABSTRACT:
**
**   These routines provide the client-side Ally specific
**   functionality.
**
*/ include <stdio.h>
include <commonp.h>        /* Common internals for RPC runtime system */
#include <com.h>            /* Externals for Common Services component */
#include <comp.h>           /* Internals for Common Services component */
#include <dce/ally.h>       /* NIDL generated include for Ally interface */
#include <dce/rpcexc.h>     /* Excpetion definitions. */
#include <dce/stubbase.h>   /* For rpc_if_rep_p_t definition. */
#include <nl_types.h>       /* For catopen(), etc... */

/*
** Local defines
*/
#define ALLY_BINDING_FILE     "/fc*ab"
#define local pathname to ally binding file
#define LINEBUFSZ 512

/*
** Local type definitions.
*/
typedef struct wk_list_elt   wk_list_elt_t, *wk_list_elt_p_t;

struct wk_list_elt
{
    wk_list_elt_p_t   next;
    rpc_if_rep_p_t    ifspec;
```

-104-
```
};

/*
** Local variables
*/
static char *binding_list = NULL;

#ifdef EXPORTS
/* ally_binding is used as binding handle for exported APIs
*/
rpc_binding_handle_t    ally_binding;
#else
INTERNAL rpc_binding_handle_t    ally_binding;
endif client_ch_t            ally_client_ctx = NULL;
define  context ally_client_ctx
INTERNAL ally_bound = 0;
INTERNAL wk_list_elt_p_t wk_ep_list = NULL;

/*
** Local functions
*/
INTERNAL void establish_ally_assoc();
INTERNAL char *rpc__get_next_ally_binding();
INTERNAL void  rpc__set_next_ally_binding();
INTERNAL char *ally_error_inq_text();
INTERNAL unsigned32 ally__rpc_protid_to_ally_protid();
INTERNAL void ally__ifspec_to_ally_ifrep();

/*
 * External functions
 */
char *rpc__get_wk_ally_bindings();

/*
**++
**
**   ROUTINE NAME:        establish_ally_assoc
**
**   SCOPE:              INTERNAL
**
**   DESCRIPTION:
**
**   Uses the list of local Ally addresses to establish a binding to one of
**   the Allys.  It will then obtain the "real" binding of the Ally to be
**   used, based on Ally loading data.  Finally, a client context is
**   created with the Ally for all future transactions.
**
**   INPUTS:    none
```

```
**
**   OUTPUTS:
**
**       status              The result of the operation. One of:
**                              rpc_s_ok
**                              rpc_s_no_bindings
**                              rpc_s_invalid_binding
**
**   IMPLICIT INPUTS:    none
**
**   IMPLICIT OUTPUTS:   none
**
**   FUNCTION VALUE:     void
**
**   SIDE EFFECTS:       none
**
**--
**/

INTERNAL void
establish_ally_assoc
    (status)
    unsigned32 *status;
{
    unsigned32 st;
    register char *string_binding;
    unsigned_char_t *alternate_ally = NULL;
    int         redirected = 0;
    int         num_protocols = 0;
    protocols_struct    protocols[rpc_c_protseq_id_max];
    int         pseqid;
    int         i;

/*
     * We have to pass a list of the protocol sequences that we know of over
     * to the Ally so that the Ally may provide a forwarding service for us.
     * Let's construct this list now.
     */ for (pseqid = 0; pseqid < rpc_c_protseq_id_max; pseqid++)
    {
      if (RPC_PROTSEQ_INQ_SUPPORTED(pseqid))
      {
        protocol_name_p_t protocol;

if (strlen(RPC_PROTSEQ_INQ_PROTSEQ(pseqid)) >= ALLY_MAX_PROTOCOL_LEN)
        {
          RPC_PROTSEQ_INQ_PROTSEQ(pseqid)));
          continue;
```

-106-
```
        }
        RPC_MEM_ALLOC (
          protocol,
          protocol_name_p_t,
          ALLY_MAX_PROTOCOL_LEN,
          rpc_c_mem_string,
          rpc_c_mem_waitok);

strcpy((char *)protocol,
RPC_PROTSEQ_INQ_PROTSEQ(pseqid));
        protocols[num_protocols].name = protocol;
        protocols[num_protocols++].protocol_id = ally__rpc_protid_to_ally_protid(RPC_PROTSEQ_INQ_PROT_ID
(pseqid));
      }
    }

/*
     * Initially, assume that none of the bindings are
valid.
     */
    *status = rpc_s_invalid_binding;

/*
     * Start off on the well-known Ally binding list.  This
routine is very
     * platform dependent.
     */ rpc__set_next_ally_binding(rpc__get_wk_ally_bindings());

/*
     * Loop through the list of Ally bindings until we find
one that we
     * will attempt to talk to.
     */ while ((string_binding =
rpc__get_next_ally_binding(status)) != NULL)
    {
      /*
       * We have a possible string binding, so try to convert
it into a
       * real binding handle.
       */ rpc_int_binding_from_string_binding(string_binding,
&ally_binding,
                                                      status);
```

```
                                    -107-
        if (*status != rpc_s_ok)
        {
            continue;
        }

/*
         * Allocate a buffer to hold the alternate Ally binding
returned from
         * one of our Allys.
         */
        if (alternate_ally == NULL)
        {
            RPC_MEM_ALLOC (
              alternate_ally,
              unsigned_char_p_t,
              ALLY_MAX_STRING_BINDING_LEN,
              rpc_c_mem_string,
              rpc_c_mem_waitok);
        }

/*
         * Initialize the length of the return string from the
Ally.
         */
        memset(alternate_ally, '.',
ALLY_MAX_STRING_BINDING_LEN-1);
        alternate_ally[ALLY_MAX_STRING_BINDING_LEN-1] = '\0';

/*
         * Looks like we have an active ally.  Ping the Ally!
         */
        TRY
        {
            (ally_v1_0_c_epv.client_establish_ally_assoc)
                (ally_binding, &context, (string_t *)
alternate_ally,
                 redirected, num_protocols, protocols,
status);
        }
        CATCH(rpc_x_comm_failure)
        {
            RPC_DBG_PRINTF(rpc_e_dbg_ally, 1,
              ("rpc__ally_init() - rpc_x_comm_failure from ally
%s.\n",
               string_binding));
            rpc_binding_free(&ally_binding, status);
            continue;
        }
        CATCH(rpc_x_unknown_if)
        {
            rpc_binding_free(&ally_binding, status);
            continue;
        }
```

-108-
```
    CATCH_ALL
    {
        /*
         * Not an exception that we recognize. Let it
propagate out.
         */
        RERAISE;
    }
    ENDTRY if (*status == ally_s_ok)
        break;
    else if (*status == ally_s_redirected)
    {
        /*
         * We've been redirected to another Ally.  Pass the
redirected flag
         * to the next Ally so that they don't try to
redirect us again.
         */ redirected = 1;
        rpc__set_next_ally_binding(alternate_ally);
        rpc_binding_free(&ally_binding, status);
        alternate_ally = NULL;
        continue;
    }
}

/*
 * Free any resources...
 */
if (alternate_ally != NULL)
    RPC_MEM_FREE(alternate_ally, rpc_c_mem_string);
for (i = 0; i < num_protocols; ++i)
    RPC_MEM_FREE(protocols[i].name, rpc_c_mem_string);

/*
 * We're all initialized with the Ally.
 */
ally_bound = 1;
}

/*
**++
**
**  ROUTINE NAME:      ally_ns_binding_lookup_begin
**
**  SCOPE:             PRIVATE
**
**  DESCRIPTION:
**
```

```
-109-
** This routine is called by the rpc_ns_binding_lookup_begin function to
** create a naming service lookup context on the Ally.
**
** INPUTS:
**
**      entry_name_syntax   An integer value that specifies the syntax of
**                          the next argument, entry_name. Specifying NULL causes
**                          the Ally's default entry syntax to be used.
**
**      entry_name          The entry in the namespace in which the search for
**                          compatible bindings is to commence. Specifying NULL
**                          causes the Ally's default entry name to be used.
**
**      if_spec             A pointer to an interface specification describing
**                          the desired interface.
**
**      object_uuid         An optional object uuid which would be used to
**                          further qualify the interface. For a non-nil uuid,
**                          only compatible bindings are returned from a server
**                          entry if the server has exported the specified object
**                          uuid. If the object uuid's are not of concern to the
**                          caller, specify a NULL pointer value or a nil uuid.
**
**      binding_max_cnt     A user-specified limit on the size of the binding
**                          vector to be allocated for returning bindings. The
**                          size of the vector is specified in units of "bindings".
**                          What this translates into in terms of actual memory
**                          is not (can not and should not) be known to the user.
**
** INPUTS/OUTPUTS:     none
**
** OUTPUTS:
**
**      lookup_context      A pointer to a lookup context to be used in the search.
```

```
**                      -110-
**
**      status          The result of the operation. One of:
**                          rpc_s_ok
**                          rpc_s_no_memory
**                          rpc_s_invalid_object
**
**  IMPLICIT INPUTS:    none
**
**  IMPLICIT OUTPUTS:   none
**
**  FUNCTION VALUE:     void
**
**  SIDE EFFECTS:       none
**
**--
**/

PRIVATE void
ally_ns_binding_lookup_begin (entry_name_syntax, entry_name, if_spec,
    object_uuid, binding_max_cnt, lookup_context, status)

unsigned32              entry_name_syntax;
unsigned_char_p_t       entry_name;
rpc_if_handle_t         if_spec;
uuid_p_t                object_uuid;
unsigned32              binding_max_cnt;
rpc_ns_handle_t         *lookup_context;
unsigned32              *status;

{
    error_status_t  st;
    ally_if_rep_t   ally_if_rep;
    ally_ifspec_p_t ally_ifspec;
    ns_handle_t         ns_context;

if (context == NULL)
    {
     establish_ally_assoc(&st);
     if (st != ally_s_ok)
     {
         *status = rpc_s_no_ally_context;
         return;
     }
    }

/*
     * If an if_spec is specified, we have to convert it into a form
     * transmittable over the net. (i.e. with EPVs, etc.)
     */
    if (if_spec)
    {
```

```
      ally__ifspec_to_ally_ifrep(if_spec, &ally_if_rep);
      ally_ifspec = &ally_if_rep;
    }
    else ally_ifspec = NULL;

/*
     * Call the Ally.
     */
    (ally_v1_0_c_epv.a_rpc_ns_binding_lookup_begin)
        (context,
         entry_name_syntax,
         (string_t *)entry_name,
         ally_ifspec,
         object_uuid,
         binding_max_cnt,
         &ns_context,
         &st);

if (st == ally_s_ok)
    {
     *lookup_context = (rpc_ns_handle_t) ns_context;
     *status = rpc_s_ok;
    }
    else
     *status = st;
}

/*
**++
**
**  ROUTINE NAME:       rpc__get_next_ally_binding
**
**  SCOPE:              INTERNAL
**
**  DESCRIPTION:
**
**  This routine is used to obtain the next Ally binding to
try from the
**  list of Ally bindings.  The Ally binding list is a list
of ";"
**  separated DCE string bindings.  ";" was chosen because
it is not a
**  valid string binding character.
**
**  INPUTS:     none
**
**  OUTPUTS:            none
**
**  IMPLICIT INPUTS:    none
**
**  IMPLICIT OUTPUTS:   none
**
**  FUNCTION VALUE:     char *
```

```
**
**   SIDE EFFECTS:      none
**
**--
**/

INTERNAL char *rpc__get_next_ally_binding(status)
    unsigned32 *status;
{
    register char *returned_binding;

if (binding_list == NULL)
    {
     *status = rpc_s_no_bindings;
     return(NULL);
    } returned_binding = binding_list;

if ((binding_list = strchr(returned_binding, (int) ';'))
!= NULL)
        *binding_list++ = '\0';

*status = rpc_s_ok;
    return(returned_binding);
}

/*
**++
**
**   ROUTINE NAME:      rpc__set_next_ally_binding
**
**   SCOPE:             INTERNAL
**
**   DESCRIPTION:
**
**   This routine is used to set the list of Ally bindings.
This
**   allows load balancing to be performed by the Ally and
the client
**   will be redirected to the least loaded Ally to use.
**
**   INPUTS:    ally_bindings  - list of Ally bindings to be
redirected to.
**
**   OUTPUTS:           none
**
**   IMPLICIT INPUTS:   none
**
**   IMPLICIT OUTPUTS:  none
**
**   FUNCTION VALUE:    void
**
```

```
**  SIDE EFFECTS:      none
**
**--
**/

INTERNAL void rpc__set_next_ally_binding(ally_bindings)
    char *ally_bindings;
{
    register char *returned_binding;

binding_list = ally_bindings;
}
```

APPENDIX III

ALLY.C

```c
/*
 * ally.c -
 *
 *    Main Ally program and RPC entry points.
 */ include <stdio.h>
include <ally.h>           /* Ally network interfaces */
#include <allyint.h>             /* Ally internal interfaces */
#include <string.h>
#include <dce/pthread_exc.h>        /* Threads interfaces */

/*
 * Local defines
 */
#if defined(IDL_PROTOTYPES)
define PROTOTYPE(x) x
#else
define PROTOTYPE(x) ()
endif /*
     * MAX_CURRENT_CALLS - number of RPC server threads.
     */
    #define MAX_CURRENT_CALLS rpc_c_listen_max_calls_default
/*
 * Local type declarations
 */

/*
 * Forward declarations
 */
INTERNAL void  ally_init
PROTOTYPE((
    unsigned char   *
));

INTERNAL void   ally_init
PROTOTYPE((
        unsigned char   *

));

#if 0
INTERNAL void client_establish_ally_assoc
PROTOTYPE((handle_t, client_ch_t *,
```

-115-
```
    string_t *, idl_long_int, idl_long_int,
protocols_struct [],
    error_status_t *));
INTERNAL void a_are_you_there PROTOTYPE((client_ch_t,
error_status_t *));
INTERNAL void a_load_info PROTOTYPE(( handle_t, load_info_t
*,
    error_status_t *));
INTERNAL void a_rpc_binding_from_string_bind
PROTOTYPE((client_ch_t,
    string_t *, error_status_t *));
INTERNAL void a_rpc_binding_free PROTOTYPE((handle_t, long,
string_t *,
    error_status_t *));
INTERNAL void a_rpc_binding_reset PROTOTYPE((client_ch_t,
string_t *,
    error_status_t *));
INTERNAL void a_rpc_ns_binding_lookup_begin
PROTOTYPE((client_ch_t, unsigned32,
    string_t *, ally_ifspec_p_t, uuid_p_t, unsigned32,
ns_handle_t *,
    error_status_t *));
INTERNAL void a_rpc_ns_binding_lookup_next
PROTOTYPE((ns_handle_t, long *,
    string_binding_p_t [], error_status_t *));
INTERNAL void a_rpc_ns_binding_lookup_done();
INTERNAL void a_rpc_binding_set_auth_info
PROTOTYPE((client_ch_t, string_t *,
    principal_name_p_t, unsigned32, unsigned32,
    rpc_opq_auth_identity_handle_t, unsigned32,
error_status_t *));
INTERNAL void a_rpc_binding_inq_auth_info
PROTOTYPE((client_ch_t, string_t *,
    principal_name_p_t *, unsigned32 *, unsigned32 *,
    rpc_opq_auth_identity_handle_t *, unsigned32 *,
error_status_t *));
INTERNAL void a_rpc_if_register_auth_info
PROTOTYPE((client_ch_t,
    ally_ifspec_p_t, principal_name_p_t, unsigned32,
unsigned32,
    rpc_opq_auth_identity_handle_t, unsigned32,
error_status_t *));
INTERNAL void a_sec_login_setup_identity();
INTERNAL void a_sec_login_validate_identity();
endif /*
 * Internal variables.
 */
ally_v1_0_epv_t    ally_v1_0_manager_epv =
{
    client_establish_ally_assoc,
```

-116-
```
    a_are_you_there,
    a_load_info,
    a_rpc_binding_from_string_bind,
    a_rpc_binding_free,
    a_rpc_binding_reset,
    a_rpc_ns_binding_lookup_begin,
    a_rpc_ns_binding_lookup_next,
    a_rpc_ns_binding_lookup_done,
    a_rpc_binding_set_auth_info,
    a_rpc_binding_inq_auth_info,
    a_rpc_if_register_auth_info,
    a_sec_login_setup_identity,
    a_sec_login_validate_identity,
    a_rpc_if_set_wk_endpoint,
};

/*
 * main() -
 *
 *     Ally main program.  Initialize everything and listen
 for RPC requests.
 */
int
main
#if defined(IDL_PROTOTYPES)
(
    int         argc,
    char        **argv
)
#else   /* !IDL_PROTOTYPES */
(argc, argv)
    int         argc;
    char        *argv[];
#endif /* !IDL_PROTOTYPES */
{
    int                 uid;
    error_status_t      status;
    rpc_binding_vector_p_t   bvec;
    unsigned char       error_msg[256];

globalref   rpc_if_handle_t    ally_v1_0_s_ifspec;

if (argc != 1)
    {
     fprintf(stderr, "usage: %s&\n", *argv);
     exit(1);
    }

*/
    ally_init ((unsigned char *)argv[0]);
```

```
/*
 * Register the Ally interface with the RPC runtime.
 */
    rpc_server_register_if(ally_v1_0_s_ifspec, (uuid_p_t) NULL,
                (rpc_mgr_epv_t)&ally_v1_0_manager_epv, &status);
    if (status != rpc_s_ok)
    {
     dce_error_inq_text(status, error_msg, NULL);
     FATAL(("ally: rpc_server_register_if failed: \"%s\"\n",error_msg), status);
    }
    /*
     * Have the RPC runtime use all available protocol sequences to listen for
     * Ally requests.
     */

/*
     * Now, let's find what the runtime actually bound.
     */
    rpc_server_inq_bindings(&bvec, &status);
    if (status != rpc_s_ok)
    {
     dce_error_inq_text(status, error_msg, NULL);
     FATAL(("ally: rpc_server_inq_bindings failed: \"%s\"\n",error_msg), status);
    }

/*
     * Register our endpoints with the rpcd endpoint mapper service.
     */
    rpc_ep_register(ally_v1_0_s_ifspec, bvec, (uuid_vector_t *)NULL,
                (unsigned_char_t *)NULL, &status);
    if (status != rpc_s_ok)
    {
     dce_error_inq_text(status, error_msg, NULL);
     ALLY_DBG_LEVEL(ally_debug_init, 1,
       ("ally: rpc_ep_register failed: \"%s\"\n", error_msg));
    }
    /*
     * Try to export our bindings into the namespace.
     */
    rpc_ns_binding_export(
          rpc_c_ns_syntax_default,       /* Name syntax */
          (unsigned_char_p_t) ally_binding_entry,  /* Entry name */
          ally_v1_0_s_ifspec,            /* IDL interface spec */
          bvec,                          /* Binding handle vector */
```

-118-
```
         NULL,                        /* Object UUID vector */
         &status);
    if (status != rpc_s_ok)
    {
     dce_error_inq_text(status, error_msg, NULL);
    } while (true)
    {
     rpc_binding_handle_t    binding;
     unsigned_char_t    *string_binding;
     unsigned_char_t *uuid, *protseq, *netaddr, *endpoint,
*netopt;

/*
      * Select the next binding from the binding vector.
      */
     rpc_ns_binding_select(bvec, &binding, &status);
     if (status == rpc_s_no_more_bindings)
         break;

if (status != rpc_s_ok)
     {
         dce_error_inq_text(status, error_msg, NULL);
     } rpc_binding_to_string_binding(binding, &string_binding,
&status);
     if (status != rpc_s_ok)
     {
         dce_error_inq_text(status, error_msg, NULL);
          error_msg));
         continue;
     }

/*
      * We're done with this binding.
      */
     rpc_binding_free(&binding, &status);

rpc_string_binding_parse(string_binding, &uuid,
&protseq, &netaddr,
                              &endpoint, &netopt, &status);
     if (status != rpc_s_ok)
     {
         dce_error_inq_text(status, error_msg, NULL);
         continue;
     } db_register_ally_protocol(protseq, &status);
     if (status != ally_s_ok)
     {
         continue;
```

```
    } rpc_string_free(&string_binding, &status);
}

/*
 * We're done with the binding vec for now.
 */
rpc_binding_vector_free(&bvec, &status);

/*
 * Enable the listener.
 */
TRY
{
 printf("Ally is ready.\n");

rpc_server_listen(MAX_CURRENT_CALLS, &status);
 if (status != 0)
 {
      dce_error_inq_text(status, error_msg, NULL);

}
CATCH(cma_e_alerted)
{
 printf("Ally has been alerted.  Terminating.\n");
}
CATCH_ALL
{
 fflush (stdout);
 fflush (stderr);
 RERAISE;
}
ENDTRY /*
     * Upon returning, ally_atexit() is called to do the
clean-up. (Set up by
     * a call to atexit() on DPX.
     */
    return(0);
}
```

-120-

```
/*
**   ROUTINE NAME:       ally_atexit
**
**   DESCRIPTION:
**              This function is a handler passed to
atexit(). It is called
**   when exit() is called. It is an indirection to
ally_exit() with the right
**   parameters.
*/ void
ally_atexit
#if defined(IDL_PROTOTYPES)
(
        void
)
#else  /* !IDL_PROTOTYPES */
()
#endif /* !IDL_PROTOTYPES */
{
    ally_exit (-1);

}
```

```
/*
**      ROUTINE NAME:           ally_exit
**
**      DESCRIPTION:
**                      This function goal is to clean things up
when the ally exits.
**      There are three cases when it is called:
**      *   When the main TRY-ENDTRY loop of the ally's main()
ends (this happen
**          when a cancel was received by it).
**      *   When a signal was caught, this function is called as
a handler.
**      *   When exit() is called anywhere in the ally.
**      The cleaning up consists mainly in unregistering the
ally from the servers
**      to which it registered.
**
**
**          If signo == 0 : the function was called after a
normal termination.
**          If signo < 0  : the function was called by exit().
**          If signo > 0  : the function was called as a signal
handler.
**
*/ void
ally_exit ifdef  DPX
if defined(IDL_PROTOTYPES)
(
        int     signo
)
#else   /* !IDL_PROTOTYPES */
(signo)
        int     signo;
endif  /* !IDL_PROTOTYPES */ else if defined(IDL_PROTOTYPES)
(
        void
)
#else   /* !IDL_PROTOTYPES */
()
endif  /* !IDL_PROTOTYPES */ endif  /* DPX */
{
    rpc_binding_vector_p_t          bvec;
```

-122-
```
    error_status_t             status;
    unsigned char              error_msg[256];
    sigset_t                   sigset;

if (signo > (int)NULL)
        fprintf (stderr, "Ally: Exit because signal %d caught.\n", signo);
    else if (signo < (int)NULL)
        fprintf (stderr, "Ally: exit(?) called.\n");
    else
        fprintf (stderr, "Ally: Exit normally.\n");

/*
     * Disable signals as we don't want to be interupted anymore since we
     * do intend to exit !!!
     */
    sigfillset (&sigset);
    sigprocmask (SIG_BLOCK, &sigset, (sigset_t *)NULL);

/*
     * Set a lock so that this function is not called a second time.
     */
    if (pthread_mutex_trylock (&ally_exiting_lock) != 1)
    {
        return;
    }

/*
     * Unregister our bindings from the namespace.
     */
    rpc_ns_binding_unexport(
        rpc_c_ns_syntax_default,          /* Name syntax */
        (unsigned_char_p_t) ally_binding_entry,  /* Entry name */
        ally_v1_0_s_ifspec,               /* IDL interface spec */
        NULL,                             /* Object UUID vector */
        &status);
    if (status != rpc_s_ok)
    {
    }

/*
     * We need to get another copy of the bindings to have the endpoint
     * mapper remove them.
     */
    rpc_server_inq_bindings(&bvec, &status);
    if (status != rpc_s_ok)
    {
      dce_error_inq_text(status, error_msg, NULL);
```

-123-
```
    FATAL(("ally: rpc_server_inq_bindings failed:
\"%s\"\n",error_msg), status);
    }

/*
     * Tell rpcd to remove our endpoints from the map.
     */
    rpc_ep_unregister(ally_v1_0_s_ifspec, bvec,
(uuid_vector_t *)NULL, &status);
    if (status != rpc_s_ok)
    {
      dce_error_inq_text(status, error_msg, NULL);
    } rpc_binding_vector_free(&bvec, &status);

/*
     * Unregister our interface from the runtime.
     */
    rpc_server_unregister_if(ally_v1_0_s_ifspec, (uuid_p_t)
NULL, &status);
    if (status != rpc_s_ok)
    {
      dce_error_inq_text(status, error_msg, NULL);
    } fflush (stdout);
    fflush (stderr);

_exit(signo);
}

/*
 * client_establish_ally_assoc() -
 *
 *   This routine is called by the client to establish a new context with
 *   the Ally.  The Ally will either accept this client, or redirect it to
 *   other Ally's based on load balancing information.  If the Ally accepts,
 *   this client, a context handle is returned to the client for future
 *   client use.  In addition. the Ally records the client's supported
 *   protocol sequences for later use by the forwarding service.
 */
void
client_establish_ally_assoc
#if defined(IDL_PROTOTYPES)
```

```
(
    handle_t         ally_handle,
    client_ch_t          *client_handle,
    string_t         *ally_binding,
    idl_long_int     redirected,
    idl_long_int     num_protocols,
    protocols_struct     protocols[],
    error_status_t   *status
)
#else   /* !IDL_PROTOTYPES */
(ally_handle, client_handle, ally_binding, redirected, status)
    handle_t         ally_handle;
    client_ch_t          *client_handle;
    string_t         *ally_binding;
    idl_long_int     redirected;
    idl_long_int     num_protocols;
    protocols_struct     protocols[];
    error_status_t   *status;
#endif /* !IDL_PROTOTYPES */
{
    unsigned char *string_binding;
    int i;

/*
     * We don't want to establish a context unless we are going to service
     * this client.  Setting the context handle to NULL causes the RPC
     * runtime to ignore the handle.
     */
    *client_handle = NULL;

/*
     * The first thing to do is to determine if we are the right one
     * to handle this client.  If we've been redirected to this Ally from
     * another one for load balancing reasons, we must accept this client.
     */
    if (!redirected)
    {
        ally_redirect_load((unsigned_char_p_t)ally_binding, status);
        if (*status != ally_s_ok)
        {
            return;
        }
    }

/*
```

```
 * Looks like we're the ally to handle this client.
 */
    rpc_binding_to_string_binding(ally_handle,
&string_binding, status);

if (*status == rpc_s_ok)
    {
     error_status_t st;

if (strlen((char *)string_binding) > strlen((char
*)ally_binding))
        *status = ally_s_inval;
     else
        strcpy((char *)ally_binding, (char
*)string_binding);

rpc_string_free(&string_binding, &st);
    }
    else
    {
     return;
    }

*client_handle = db_create_new_client_entry(status);

for (i = 0; i < num_protocols; ++i)
    { db_add_client_protocol(*client_handle,
                (unsigned_char_p_t)protocols[i].name,
                protocols[i].protocol_id,
                status);
     if (*status != ally_s_ok)
        break;
    }

}

/*
 * client_remove_ally_assoc() -
 *
 *    Context handle rundown routine for client context
handles. This
 *    routine can be called by the GCOS USERS application
program.
 *    Because it is declared in the Ally IDL interface
 *    Ally will call finally client_ch_t_rundown
 */
void
client_remove_ally_assoc
#ifdef IDL_PROTOTYPES
(
    client_ch_t context_handle
```

```
)
#else
(context_handle)
    client_ch_t context_handle;
#endif
{ client_ch_t_rundown(context_handle);

}
/*
 * client_ch_t_rundown() -
 *
 *    Context handle rundown routine for client context
handles.  This
 *    routine is called by the RPC runtime when it detects
that a client
 *    has died.  In response, the Ally will flush all of this
clients
 *    context.
 */
void
client_ch_t_rundown
#ifdef IDL_PROTOTYPES
(
    client_ch_t context_handle
)
#else
(context_handle)
    client_ch_t context_handle;
#endif
{ db_destroy_client_entry(context_handle);

}

/*
 * ns_handle_t_rundown() -
 *
 *    This routine is called when the RPC runtime determines
that a client's
 *    nameserver context handle has expired.  Currently, this
is a no-op
 *    because will will clean up in the client context
rundown routine.
 */
void
ns_handle_t_rundown
#ifdef IDL_PROTOTYPES
(
    ns_handle_t ns_handle
)
```

```
                        -127-
#else   /* !IDL_PROTOTYPES */
(ns_handle)
    ns_handle_t ns_handle;
#endif /* !IDL_PROTOTYPES */
{
    error_status_t st;

ns_destroy_context(ns_handle, &st);

}

/*
 * a_rpc_ns_binding_lookup_begin() -
 *   creates a lookup context for an interface and,
optionally, an object.
 * NOTE: the default entry and syntax are specified in the
env. variables,
 * RPC_DEFAULT_ENTRY and RPC_DEFAULT_ENTRY_SYNTAX.  We have
to find a way to
 * get this thing across to the Ally.  It seems the client
RPC runtime can
 * resolve it before sending this request to the Ally.
 */
void
a_rpc_ns_binding_lookup_begin
#if defined(IDL_PROTOTYPES)
(
    client_ch_t        client_handle,
    unsigned32         entry_name_syntax,
    string_t           *entry_name,
    ally_ifspec_p_t    if_spec,
    uuid_p_t           object_uuid,
    unsigned32         binding_max_count,
    ns_handle_t        *lookup_context,
    error_status_t     *status
)
#else   /* !IDL_PROTOTYPES */
(client_handle, entry_name_syntax, entry_name, if_spec,
object_uuid,
 binding_max_count, lookup_context, status)
    client_ch_t        client_handle;
    unsigned32         entry_name_syntax;
    string_t           *entry_name;
    ally_ifspec_p_t    if_spec;
    uuid_p_t           object_uuid;
    unsigned32         binding_max_count;
    ns_handle_t        *lookup_context;
    error_status_t     *status;
#endif /* !IDL_PROTOTYPES */
{
```

```
    ns_lookup_begin(client_handle, entry_name_syntax,
entry_name, if_spec,
        object_uuid, binding_max_count, lookup_context,
status);

}

/*
** ROUTINE NAME:       ally_threads_init
**
** DESCRIPTION:
**              Initialize threads in the ally, in case it was not already
** done.
*/ void
ally_threads_init
#if defined(IDL_PROTOTYPES)
(
        void
)
#else  /* !IDL_PROTOTYPES */
()
#endif /* !IDL_PROTOTYPES */
{ fprintf (stderr, "\nAlly: Initialization in progress ...");

}

/*
 * ally_init() -
 *
 *   Initialize the Ally components.
 */
void
ally_init
#ifdef IDL_PROTOTYPES
(
    unsigned char    *my_name
)
#else  /* !IDL_PROTOTYPES */
(my_name)
    unsigned char    *my_name;
#endif /* !IDL_PROTOTYPES */
{
    pthread_once_t       once_block = pthread_once_init;

/*
```

```
    * Initialize threads here to be sure of what we do. If
it was already done
    * and we weren't aware of it, this thing is useless but
absolutely not
    * dangerous.
    */
   TRY
   {
       pthread_once (&once_block, ally_threads_init);
   }
   CATCH_ALL
   {
   }
   ENDTRY /*
    * We have to init the malloc/free functions.
    */
   ally_malloc_init();
   /*
    * Initialize the database subsystem
    */
   ally_db_init();

/*
    * Initialize the namespace subsystem
    */
   ally_ns_init();

/*
    * Initialize the listener subsystem.
    */
   ally_listener_init();

}
```

-130-
APPENDIX III

ALLYDB.C

```c
/*
 * allydb.c -
 *
 *     This file contains the routines used to maintain and manipulate the
 *     Ally's client database.
 */ include <ally.h>
include <allyint.h>
#include <dce/pthread_exc.h>
#include <stdlib.h>
#include <string.h>

/*
 * Local defines
 */
#define dbentry_hash(x)   ((unsigned long) x % DB_ENTRY_TABLE_MAX)
define DB_ENTRY_TABLE_MAX    63 if defined(IDL_PROTOTYPES)
define PROTOTYPE(x) x
#else
define PROTOTYPE(x) ()
endif /*
 * Local type declarations
 */
struct address_info
{
    struct address_info     *next;
    uuid_p_t                activity_uuid;
    struct sockaddr         *address;
    long int                length;
};

typedef struct endpoint_info endpoint_info_t, *endpoint_info_p_t;

struct endpoint_info
{
    endpoint_info_p_t   next;
    ally_ifspec_p_t     if_spec;
    int                 num_endpoints;
    endpoint_t          endpoints[1];       /* Variable size */
};
```

-131-

```
struct endpoint_hdr
{
    pthread_mutex_t     lock;
    unsigned            ref_count;
    endpoint_info_p_t       endpoint_list;
};

typedef struct forwarding_info forwarding_info_t,
*forwarding_info_p_t;

struct forwarding_info
{
    forwarding_info_p_t     next;
    pthread_mutex_t     lock;
    unsigned            ref_count;
    struct dbentry      *context_handle;
    unsigned_char_p_t       proxy_binding;
    long int            protocol_type;
    security_info_p_t       auth_info;
    long            client_socket;
    struct address_info     client_address;
    long            server_socket;
    unsigned32          server_socket_family;
    struct address_info     *server_addresses;
    struct sockaddr     **server_broadaddrs;
    long int            broadaddr_len;
    unsigned_char_p_t       server_binding;
    struct endpoint_hdr     *wk_endpoints;
    unsigned            have_client_address:1;
    unsigned            is_active:1;
};

typedef struct protocol_info protocol_info_t,
*protocol_info_p_t;

struct protocol_info
{
    protocol_info_p_t       next;
    unsigned_char_p_t       protocol_name;
    int                 protocol_type;
};

typedef struct interface_info interface_info_t,
*interface_info_p_t;

struct interface_info
{
    interface_info_p_t  next;
    ally_ifspec_p_t if_spec;
    security_info_p_t   auth_info;
};
```

```
-132-
typedef struct dbentry dbentry_t, *dbentry_p_t;
struct dbentry
{
    dbentry_p_t         next;
    pthread_mutex_t lock;
    forwarding_info_p_t forwarding;
    unsigned32          num_protocols;
    protocol_info_p_t   protocols;
    interface_info_p_t  secure_interfaces;
    auth_ident_info_p_t identities;
    struct endpoint_hdr wk_endpoints;
};

/*
 * Forward definitions
 */

INTERNAL void db_destroy_protocol_info
PROTOTYPE((protocol_info_p_t));
INTERNAL void db_destroy_forwarding_info
PROTOTYPE((forwarding_info_p_t));
INTERNAL void db_destroy_secure_interface_info
PROTOTYPE((interface_info_p_t));
INTERNAL dbentry_p_t db_entry_lock PROTOTYPE((dbentry_p_t));
INTERNAL long int ally_protocol_name_to_type
PROTOTYPE((unsigned_char_p_t));
INTERNAL void db_auth_info_create
PROTOTYPE((security_info_p_t *,
    principal_name_p_t, unsigned32, unsigned32, unsigned32,
auth_ident_info_p_t,
    error_status_t *));
INTERNAL void db_auth_info_lookup
PROTOTYPE((security_info_p_t,
    principal_name_p_t *, unsigned32 *, unsigned32 *,
unsigned32 *,
    auth_ident_info_p_t *, error_status_t *));
INTERNAL void db_auth_info_reference
PROTOTYPE((security_info_p_t));
INTERNAL void db_auth_info_free
PROTOTYPE((security_info_p_t));
INTERNAL void db_proxy_shutdown
PROTOTYPE((forwarding_info_p_t));
#if !defined (GRPC_SEC)
INTERNAL auth_ident_info_p_t db_auth_identity_reference
PROTOTYPE((dbentry_p_t,
    uuid_t *, error_status_t *));
#else
INTERNAL auth_ident_info_p_t db_auth_identity_reference
PROTOTYPE((dbentry_p_t,
    sec_login_handle_t, error_status_t *));
#endif
INTERNAL void db_auth_identity_free
PROTOTYPE((auth_ident_info_p_t));
```

-133-
```
INTERNAL struct endpoint_hdr *db_wk_endpoint_reference
    PROTOTYPE((struct endpoint_hdr *));
INTERNAL void db_wk_endpoint_free PROTOTYPE((struct
endpoint_hdr *));

/*
 * Internal variables
 */
    /*
     * Because of the multithreaded-ness of the Ally, we
must define a table
     * to allow us to map context handles into client
database entries.  Even
     * though the context handle is actually a pointer to
the client's database
     * entry, we have to look it up in this table to
guarantee that the entry
     * has not been asynchronously deleted by another
thread.
     */
INTERNAL pthread_mutex_t dbentry_table_lock;
INTERNAL dbentry_p_t
    dbentry_table[DB_ENTRY_TABLE_MAX];

/*
     * Ally protocol list
     */
INTERNAL protocol_info_p_t   ally_protocols = NULL;

/*
 * ally_db_init -
 *
 *   Routine to initialize the database section of the
ally.
 */
void
ally_db_init
#if defined(IDL_PROTOTYPES)
(void)
#else  /* !IDL_PROTOTYPES */
()
#endif /* !IDL_PROTOTYPES */
{
    pthread_mutex_init(&dbentry_table_lock,
pthread_mutexattr_default);

memset(dbentry_table, 0, sizeof(dbentry_table));

}
```

```
/*
 * db_create_new_client_entry -
 *
 *   This routine is used to establish a new client entry in the database.
 *   It returns either a pointer to the new entry or NULL in case of an
 *   error.
 */
void *
db_create_new_client_entry
#if defined(IDL_PROTOTYPES)
(
    error_status_t   *status
)
#else   /* !IDL_PROTOTYPES */
(status)
    error_status_t   *status;
#endif /* !IDL_PROTOTYPES */
{
    dbentry_p_t      entry;
    int index;

if ((entry = ally_calloc(sizeof(dbentry_t), 1, ally_malloc_dbentry))
                                                              == NULL)
    *status = ally_s_nomem;
    }
    else
    {
    pthread_mutex_init(&entry->lock, pthread_mutexattr_default);
    pthread_mutex_init(&entry->wk_endpoints.lock,pthread_mutexattr_default);
        entry->wk_endpoints.ref_count = 1;
        *status = ally_s_ok;
    }

/*
     * Now, let's go add this entry to the table.
     */
    index = dbentry_hash(entry);

pthread_mutex_lock(&dbentry_table_lock);
        entry->next = dbentry_table[index];
        dbentry_table[index] = entry;
    pthread_mutex_unlock(&dbentry_table_lock);

return(entry);
}
```

APPENDIX III

ALLYNS.C

```c
/*
 * allyns.c -
 *
 *    This file contains the routines needed to provide CDS namespace
 *    access to client programs.
 */
include <ally.h>
#include <allydbg.h>
#include <allyint.h>
#include <stdlib.h>
#include <dce/stubbase.h>      /* for rpc_if_rep_t definition. */

/*
 * Local defines
 */
#define nsentry_hash(x)   ((unsigned long) x % NS_ENTRY_TABLE_MAX)
define NS_ENTRY_TABLE_MAX    31 if defined(IDL_PROTOTYPES)
define PROTOTYPE(x) x
#else
define PROTOTYPE(x) ()
endif /*
 * Local type declarations
 */
typedef struct binding_node binding_node_t, *binding_node_p_t;
struct binding_node
{
    binding_node_p_t        next;
    unsigned_char_p_t       string_binding;
};

typedef struct nsentry nsentry_t, *nsentry_p_t;
struct nsentry
{
    nsentry_p_t             next;
    pthread_mutex_t         lock;
    client_ch_t             client_handle;
    rpc_ns_lookup_handle_t  ns_context;
    unsigned32              entry_name_syntax;
    string_t                *entry_name;
```

```
        ally_ifspec_p_t      if_spec;
        uuid_p_t             object_uuid;
        unsigned32           binding_max_count;
        unsigned32           num_bindings;
        binding_node_p_t         ns_bindings;
        binding_node_p_t         current_binding;
        binding_node_p_t         last_binding;
        unsigned_char_p_t        proxy_binding;
        unsigned             is_proxy:1;
};

/*
 * Internal variables
 */
INTERNAL pthread_mutex_t nsentry_table_lock;
INTERNAL nsentry_p_t
    nsentry_table[NS_ENTRY_TABLE_MAX];

/*
 * Forward declarations.
 */
INTERNAL void convert_ally_ifrep PROTOTYPE((ally_ifspec_p_t,
rpc_if_rep_p_t *));
INTERNAL void free_rpc_ifrep PROTOTYPE((rpc_if_rep_p_t));
INTERNAL void ns_destroy_binding_list
PROTOTYPE((binding_node_p_t));
INTERNAL void ns_destroy_binding_node
PROTOTYPE((binding_node_p_t));
INTERNAL nsentry_p_t ns_entry_lock PROTOTYPE((nsentry_p_t));
INTERNAL nsentry_p_t ns_create_new_context
PROTOTYPE((error_status_t *));

/*
 * ally_ns_init -
 *
 *     Routine to initialize the namespace context table.
 */
void
ally_ns_init
#if defined(IDL_PROTOTYPES)
(void)
#else   /* !IDL_PROTOTYPES */
()
#endif /* !IDL_PROTOTYPES */
{ pthread_mutex_init(&nsentry_table_lock,pthread_mutexattr_def
ault);
    memset(nsentry_table, 0, sizeof(nsentry_table));
}
```

```
/*
 * ns_lookup begin() -
 *
 *    Create an Ally namespace context for this client.
 */
void
ns_lookup_begin
#if defined(IDL_PROTOTYPES)
(
    client_ch_t       client_handle,
    unsigned32        entry_name_syntax,
    string_t          *entry_name,
    ally_ifspec_p_t   if_spec,
    uuid_p_t          object_uuid,
    unsigned32            binding_max_count,
    ns_handle_t           *lookup_context,
    error_status_t    *status
)
#else   /* !IDL_PROTOTYPES */
(client_handle, entry_name_syntax, entry_name, if_spec, object_uuid,
 binding_max_count, lookup_context, status)
    client_ch_t     client_handle;
    unsigned32      entry_name_syntax;
    string_t        *entry_name;
    ally_ifspec_p_t   if_spec;
    uuid_p_t        object_uuid;
    unsigned32          binding_max_count;
    ns_handle_t     *lookup_context;
    error_status_t  *status;
#endif /* !IDL_PROTOTYPES */
{
    nsentry_p_t                entry;
    ally_ifspec_p_t    if_spec_copy;
    string_t           *entry_name_copy = NULL;
    uuid_p_t           object_uuid_copy = NULL;
    rpc_ns_lookup_handle_t   real_lookup_handle;
    rpc_if_rep_p_t     real_if_rep;

/*
     * Let's make sure that this client is registered with us.
     */
    db_is_client_valid(client_handle, status);
    if (*status != ally_s_ok)
    {
    }

/*
     * First, call rpc_ns_binding_lookup_begin() locally to get a NS context
     * handle from the CDS.
     */
```

```
                                        -138-
    convert_ally_ifrep(if_spec, &real_if_rep);

/*
     * Make sure that binding_max_count is sane.
     */
    if (binding_max_count == 0)
     binding_max_count = rpc_c_binding_max_count_default;

rpc_ns_binding_lookup_begin(entry_name_syntax, (unsigned
char *)entry_name,
              (rpc_if_handle_t)real_if_rep, object_uuid,
binding_max_count,
              &real_lookup_handle, status);

free_rpc_ifrep(real_if_rep);

if (*status != rpc_s_ok)
    {
     return;
    }

/*
     * Allocate a new entry in the NS context table.
     */
    entry = ns_create_new_context(status);
    if (*status != ally_s_ok)
    {
     return;
    }

/*
     * Get some memory for the data structures that we have
to save.
     */
     if ((if_spec_copy = ally_malloc(sizeof(ally_if_rep_t),
ally_malloc_ally_ifspec)) == NULL ||
       (entry_name &&
       (entry_name_copy = ally_malloc(strlen((char
*)entry_name) + 1, ally_malloc_string)) == NULL) ||
       (object_uuid &&
       (object_uuid_copy = ally_malloc(sizeof(uuid_t),
ally_malloc_objuuid)) == NULL))
     {
     if (if_spec_copy != NULL)
         ally_free(if_spec_copy, ally_malloc_ally_ifspec);
     if (entry_name_copy != NULL)
         ally_free(entry_name_copy, ally_malloc_string);
     /*
      * Unlock the node so we can free it.
      */
     pthread_mutex_unlock(&entry->lock);
     ns_destroy_context(entry, status);
```

```
                           -139-
  *status = ally_s_nomem;

return;
}

/*
 * Now fill in the entry.
 */
memcpy(if_spec_copy, if_spec, sizeof(ally_if_rep_t));
if (entry_name)
  strcpy((char *)entry_name_copy, (char *)entry_name);
if (object_uuid)
  memcpy(object_uuid_copy, object_uuid, sizeof(uuid_t));

entry->is_proxy = false;
entry->client_handle = client_handle;
entry->entry_name_syntax = entry_name_syntax;
entry->if_spec = if_spec_copy;
entry->entry_name = entry_name_copy;
entry->object_uuid = object_uuid_copy;
entry->ns_context = real_lookup_handle;

entry->binding_max_count = (binding_max_count <
ALLY_MAX_BINDING_VECTOR_LEN)
                    ? binding_max_count :
ALLY_MAX_BINDING_VECTOR_LEN;
  pthread_mutex_unlock(&entry->lock);

*lookup_context = entry;

*status = ally_s_ok;

}
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A distributed system including a plurality of computer systems coupled together through a common communication network, a first one of said computer systems corresponding to a non distributed computing environment (DCE) computer system which includes a first type of operating system for running non DCE application programs on said first one of said computer systems and a second one of said systems corresponding to a DCE system including a second type of operating system which is compatible with said DCE system for running application programs compiled on said second system and wherein said distributed system further includes:

an ally component and a distributed computing environment (DCE) application system installed in said second system to run in conjunction with said second type of operating system, said DCE application system including a plurality of basic distributed services and a remote procedure call (RPC) component for processing remote procedure calls between client and server application programs communicating through a pair of RPC stub components according to a predetermined RPC protocol, said ally component including a plurality of management routines for enabling local requests made by said client application programs running on said first system to be processed by accessing said plurality of distributed service components of said DCE system; and, an RPC runtime component included in said first computer system, said RPC runtime component including a RPC subcomponent and an application program interface (API) subcomponent operatively coupled to each other, said RPC subcomponent including a minimum number of ported routines responsive to a corresponding number of standard DCE RPC requests for determining when any local client request is to be forwarded to said ally component of said second computer system and said API subcomponent including a plurality of subroutines for enabling transfer of said each local client request received from said RPC subcomponent of said RPC component of said first computer system to said ally component of said second computer system using said predetermined RPC protocol established by said client and server RPC stubs for accessing a designated one of said distributed service components of said DCE application system of said second computer system thereby eliminating the need of having to port said DCE service components to operate on said first computer system.

2. The system of claim 1 wherein said first type of operating system is a proprietary operating system which does not include facilities to support said DCE application system.

3. The system of claim 1 wherein said second operating system is a UNIX based operating system which includes facilities to support said DCE system.

4. The system of 1 wherein said DCE application system includes a number of software layers, a first DCE layer including said plurality of components for providing a plurality of basic distributed services and a second layer including said RPC component of said DCE application system.

5. The system of claim 4 wherein said ally component is also included in said second layer.

6. The system of claim 1 wherein RPC communications between said first and second computer systems is established according to statements defining an ally interface and wherein said second system further includes an interface definition language (IDL) compiler, said IDL compiler being used to compile said statements into said RPC stub components and said first computer system including a compatible compiler for compiling said client application programs, said compatible compiler compiling said RPC stubs produced by said IDL compiler before being installed on said first computer system.

7. The system of claim 1 wherein said plurality of components includes a naming service component, a security service component, a time service component and a threads service component.

8. The system of claim 1 wherein said API subcomponent of said first computer system includes routines for performing operations for initially establishing association with said ally component for having said ally component carrying certain binding operations and naming service operations.

9. The system of claim 1 wherein said ally component routines for processing said client requests by generating standard DCE calls to said RPC component of said DCE application system installed in said second computer system.

10. The system of claim 9 wherein said ally component includes a routine for performing initialization sequence of operations in response to a first computer client request received from said first system.

11. A method of providing a distributed computing environment (DCE) in a system which includes a plurality of computer systems for a first one of said system which is a non-DCE computer system that does not have operating system facilities for directly supporting DCE services for application programs running in said non-DCE computer system and a second one of said computer systems which is a DCE computer system that includes a DCE application system for providing said DCE services, said DCE application system containing a plurality of components for performing said DCE services without having to port said DCE components to said first computer system, said method comprising the steps of:

a. coupling said first and second computer systems together for enabling said computer systems to process remote procedure (RPC) calls between client and server application programs running on said first and second computer systems respectively which communicate through a pair of RPC stub components;

b. installing in said first computer system, an RPC runtime component which includes an application program interface (API) component to operate in conjunction with said operating system facilities of said first computer system, said RPC runtime component including a number of routines responsive to standard DCE requests for determining when any client request for local services can not be performed by said first computer system and said API component including a plurality of subroutines for enabling transfer of said local client request to said second computer system using a predetermined RPC protocol established by said client and server RPC stubs;

c. installing in said second computer system, an ally component to run said second computer system in conjunction with said DCE components said ally component including a plurality of routines for communicating with said RPC runtime component and for processing said client requests received from said RPC runtime component of said first computer system for performing requested DCE services using said DCE components of said second computer system for those DCE components which were not ported to run on said first computer system;

d. determining by a mapping operation performed by said number of routines of said RPC runtime component of said first computer system which local client request can not be performed locally by said RPC runtime component because of not having ported said DCE components to said first computer system; and, e. translating and transferring by said API component of said RPC component of said first computer system, each client request which can not be performed locally as determined in step d into a form for receipt by said ally component for execution either by said ally component or by said ally component and said DCE components installed on said second computer system.

12. The method of claim 11 wherein said method further includes the steps of:

including in said DCE application system of said second computer system a number of servers which couples to said DCE application system RPC component; and, (g) including in said ally component routines for executing client requests by accessing corresponding ones of said servers through said RPC component for performing DCE services for said client application programs running on said first computer system.

13. A distributed system including a plurality of computer systems coupled together through a common communication network, a first one of said computer systems corresponding to a non distributed computing environment (DCE) computer system which includes a first type of operating system for running non DCE application programs on said first one of said computer systems and a second one of said systems corresponding to a DCE system including a second type of operating system which is compatible with said DCE system for running application programs compiled on said second system and wherein said distributed system further includes:

an ally component and a distributed computing environment (DCE) application system installed in said second system to run in conjunction with said second type of operating system, said DCE application system including a plurality of basic distributed services and a remote procedure call (RPC) component for processing remote procedure calls between client and server application programs communicating through a pair of RPC stub components according to a predetermined RPC protocol, said ally component including a plurality of management routines for enabling local request made by said client application programs running on said first system to be processed by accessing said plurality of distributed service components of said DCE system wherein said ally component includes a plurality of sections for processing different types of requests received from said RPC runtime component of said first computer system, said plurality of sections including a requests section, a forwarding service section coupled to said request section, a naming service section coupled to said requests section and a security service section coupled to said requests section; and, an RPC runtime component included in said first computer system, said RPC runtime component including a RPC subcomponent and an application program interface (API) subcomponent operatively coupled to each other, said RPC subcomponent including a minimum number of ported routines responsive to a corresponding number of standard DCE RPC requests for determining when any local client request is to be forwarded to said requests section of said ally component of said second computer system and said API subcomponent including a plurality of subroutines for enabling transfer of said each local client request received from said RPC subcomponent of said first computer system to said requests section of said ally component of said second computer system using said predetermined RPC protocol established by said client and server RPC stubs for accessing designated ones of said distributed service components of said DCE application system of said second computer system through other sections of said plurality of sections of said ally component thereby eliminating the need of having to port said DCE service components to operate on said first computer system.

14. A distributed system including a plurality of computer systems coupled together through a common communication network, a first one of said computer systems corresponding to a non distributed computing environment (DCE) computer system which includes a first type of operating system for running non DCE application programs on said first one of said computer systems and a second one of said systems corresponding to a DCE system including a second type of operating system which is compatible with said DCE system for running application programs compiled on said second system and wherein said distributed system further includes:

an ally component and a distributed computing environment (DCE) application system installed in said second system to run in conjunction with said second type of operating system, said DCE application system including a plurality of basic distributed services and a remote procedure call (RPC) component for processing remote procedure calls between client and server application programs communicating through a pair of RPC stub components according to a predetermined RPC protocol, said ally component including a plurality of management routines for enabling local request made by said client application programs running on said first system to be processed by accessing said plurality of distributed service components of said DCE system; and, an RPC runtime component included in said first computer system, said RPC runtime component including a RPC subcomponent and an application program interface (API) subcomponent operatively coupled to each other, said RPC subcomponent including a minimum number of ported routines responsive to a corresponding number of standard DCE RPC requests for determining when any local client request is to be forwarded to said ally component of said second computer system and said API subcomponent including a plurality of subroutines for enabling transfer of said each local client request received from said RPC subcomponent of said first computer system to said ally component of said second computer system using said predetermined RPC protocol established by said client and server RPC stubs for accessing a designated one of said distributed service components of said DCE application system of said second computer system thereby eliminating the need of having to port said DCE service components to operate on said first computer system, said RPC runtime component being constructed by compiling statements which include #ifdef declarations designating those portions of said RPC runtime component which form part of a common porting kit from those portions of said RPC runtime component which are specific to the architecture of said first system thereby facilitating said porting of DCE services to different types of non DCE based computer systems.

* * * * *